United States Patent
Fujita et al.

(10) Patent No.: US 9,727,194 B2
(45) Date of Patent: Aug. 8, 2017

(54) TOUCH PANEL APPARATUS AND POSITION DETECTION METHOD USING THE TOUCH PANEL APPARATUS

(71) Applicant: FUJITSU COMPONENT LIMITED, Tokyo (JP)

(72) Inventors: Kenichi Fujita, Tokyo (JP); Yuji Makiuchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 141 days.

(21) Appl. No.: 14/950,190

(22) Filed: Nov. 24, 2015

(65) Prior Publication Data

US 2016/0154502 A1 Jun. 2, 2016

(30) Foreign Application Priority Data

Nov. 27, 2014 (JP) .................................. 2014-240426

(51) Int. Cl.
| G06F 3/044 | (2006.01) |
| G06F 3/041 | (2006.01) |
| G06F 3/045 | (2006.01) |

(52) U.S. Cl.
CPC .............. *G06F 3/044* (2013.01); *G06F 3/045* (2013.01); *G06F 3/0416* (2013.01); *G06F 2203/04104* (2013.01)

(58) Field of Classification Search
None
See application file for complete search history.

(56) References Cited

U.S. PATENT DOCUMENTS

| 2009/0189877 A1 | 7/2009 | Washino et al. |
| 2009/0322700 A1 | 12/2009 | D'Souza et al. |
| 2010/0309163 A1 | 12/2010 | Yeh et al. |
| 2012/0001866 A1 | 1/2012 | Rapakko |
| 2012/0154325 A1 | 6/2012 | Ueno |

FOREIGN PATENT DOCUMENTS

| EP | 2063348 | 5/2009 |
| EP | 2204726 | 7/2010 |
| JP | 2004-272722 | 9/2004 |
| JP | 2008-293129 | 12/2008 |
| JP | 2009-176114 | 8/2009 |
| JP | 2010-092332 | 4/2010 |
| JP | 2012-514264 | 6/2012 |
| JP | 2012-234419 | 11/2012 |
| WO | 2013/027132 | 2/2013 |

*Primary Examiner* — Gustavo Polo
(74) *Attorney, Agent, or Firm* — IPUSA, PLLC

(57) ABSTRACT

A touch panel apparatus includes a first substrate including a first conductive film, a second substrate including a second conductive film, a first terminal, a second terminal, a third terminal, and a fourth terminal respectively provided on the second substrate, and a controller. The controller calculates a potential difference between a measured potential and a reference potential of each of the first and second terminals with connecting the first and second terminals to the power source and the third and fourth terminals to the ground potential, and a potential difference between a measured potential and a reference potential of each of the third and fourth terminals with connecting the second and third terminals to the power source and the first and fourth terminals to the ground potential, determines a potential difference having a largest value, and calculates a relationship between two contact points based on the determined potential difference.

11 Claims, 16 Drawing Sheets

TOUCH PANEL APPARATUS AND POSITION DETECTION METHOD USING THE TOUCH PANEL APPARATUS

CROSS-REFERENCE TO RELATED APPLICATIONS

This application is based upon and claims the benefit of priority of the prior Japanese Patent Application No. 2014-240426 filed on Nov. 27, 2014, the entire contents of which are incorporated herein by reference.

FIELD

The embodiments discussed herein are related to a technology for a touch panel and a position detection method using the touch panel.

BACKGROUND

A touch panel is an input device allowing data to be input directly onto a display The touch panel is used by being placed on a front surface of a display. The touch panel can be used for various purposes because the touch panel data can be input based on data that is visually recognized from a display.

A known resistive film type touch panel has a transparent conductive film formed on an upper electrode substrate and a transparent conductive film formed on a lower electrode substrate in a manner that the conductive films face each other. By exerting force to the upper electrode substrate, the conductive films contact each other to enable detection of the position at which force is exerted.

The resistive film type touch panel can be categorized into a four-wire type and a five-wire type. The four-wire type touch panel has X-axis electrodes arranged on one of the upper and lower electrode substrates and Y-axis electrodes arranged on the other one of the upper and lower electrode substrates (See Patent Document 1).

The five-wire type touch panel includes an electrode substrate that has both X-axis electrodes and Y-axis electrodes provided thereon and another electrode substrate that is used as a probe for measuring potential (See Patent Document 2).

Patent Document 3, for example, discloses a four-wire type touch panel that can detect multiple touched areas.

Patent Document 1: Japanese Laid-Open Patent Publication No. 2004-272722;
Patent Document 2: Japanese Laid-Open Patent Publication No. 2008-293129
Patent Document 3: Japanese Laid-Open Patent Publication No. 2009-176114

However, multi-touch cannot be easily detected with the five-wire type touch panel.

SUMMARY

According to an aspect of the invention, there is provided a touch panel apparatus including a first electrode substrate including a first conductive film, a second electrode substrate having four corners and including a second conductive film, a first power-feed terminal, a second power-feed terminal, a third power-feed terminal, and a fourth power-feed terminal respectively provided on the four corners, a controller, a first resistor that connects with the first power-feed terminal, a second resistor that connects with second power-feed terminal, a third resistor that connects with the second power-feed terminal, and a fourth resistor that connects with the third power-feed terminal. The controller calculates a first potential difference $\Delta V_{1X}$ between a potential of the first power-feed terminal and a first reference potential and a second potential difference $\Delta V_{2X}$ between a potential of the second power-feed terminal and a second reference potential in a state where the first power-feed terminal is connected to a power source potential via the first resistor, the second power-feed terminal is connected to the power source potential via the second resistor, and the third and fourth power-feed terminals are connected to a ground potential. The controller calculates a third potential difference $\Delta V_{2Y}$ between a potential of the second power-feed terminal and a third reference potential and a fourth potential difference $\Delta V_{3Y}$ between a potential of the third power-feed terminal and a fourth reference potential in a state where the second power-feed terminal is connected to the power source potential via the third resistor, the third power-feed terminal is connected to the power source potential via the fourth resistor, and the first and fourth power-feed terminals are connected to the ground potential. The controller selects at least a potential difference having a largest potential difference value among the first, second, third, and fourth potential differences $\Delta V_{1X}$, $\Delta V_{2X}$, $\Delta V_{2Y}$, and $\Delta V_{3Y}$. The controller calculates a positional relationship between two points where the first and second conductive films contact each other based on the selected potential difference having the largest potential difference value.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

DESCRIPTION OF EMBODIMENTS

Figure 1:
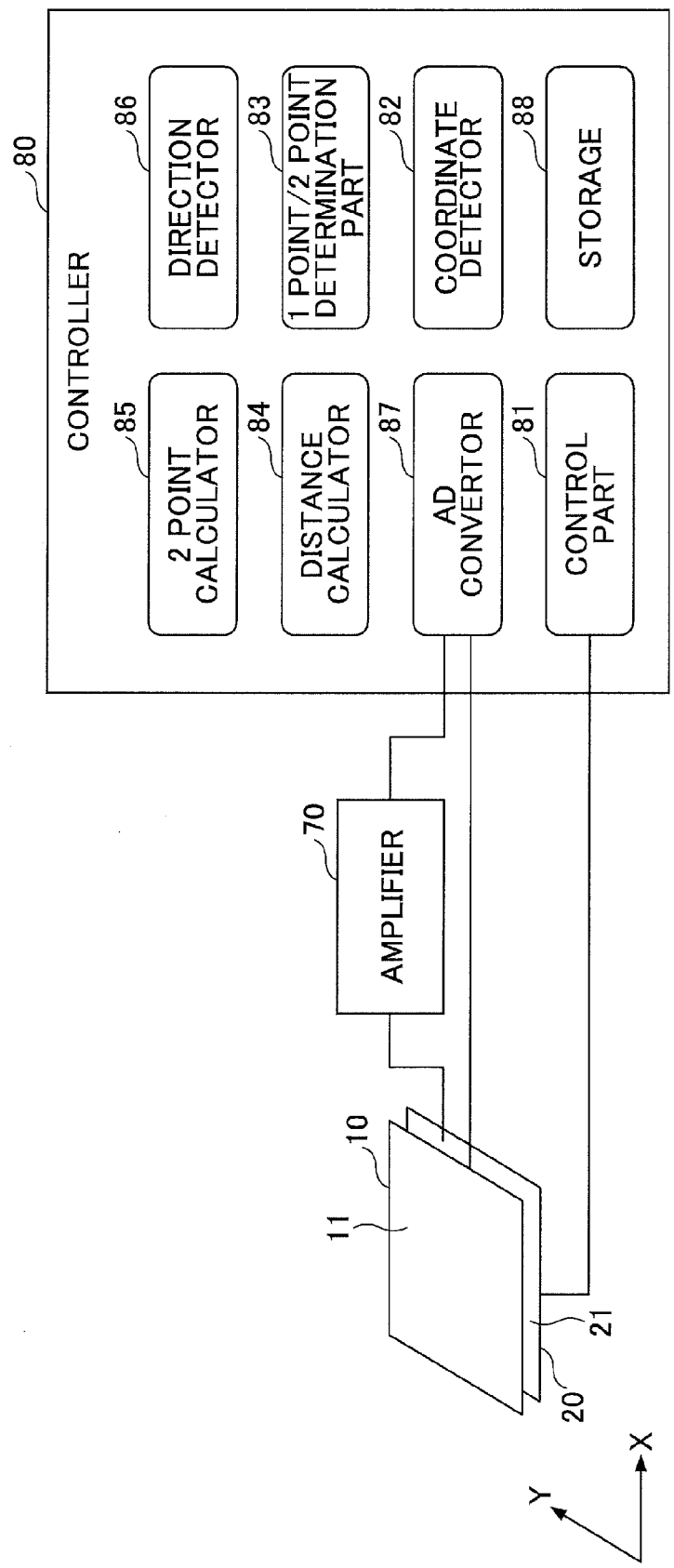
FIG. 1 is a schematic diagram illustrating a touch panel according to a first embodiment of the present invention.

Embodiments of the present invention are described with reference to the accompanying drawings. In the following embodiments, like components/parts are denoted with like reference numerals and further description thereof may be omitted.

First Embodiment

<Touch Panel>

A touch panel apparatus according to the first embodiment is described. The touch panel apparatus of this embodiment is a 5-wire touch panel including an upper electrode substrate 10 and a lower electrode substrate 20. The touch panel apparatus can detect a multi-touch operation, or a gesture operation (pinching in, pinching out) that is used for increasing or reducing the size of an image displayed on a display for example.

As illustrated in FIG. 1, the touch panel apparatus also includes an amplifier 70, and a controller 80. The controller 80 includes a control part 81, a coordinate detector 82, a determination part 83, a distance calculator 84, a 2 point calculator 85, a direction detector 86, an AD (Analog-to-Digital) convertor 87, and a storage 88.

The control part 81 controls the entire touch panel apparatus. The amplifier 70 amplifies analog voltage data obtained from various potential measurement parts provided in the touch panel apparatus. The AD convertor 87 convertor 87 receives the analog voltage data from the amplifier 70 and converts the analog voltage data into digital voltage data. The amplifier 70 is provided so that potential can be measured even in a case where the resistance change rate is low when the touch panel 100 is operated. The storage part 88 stores various data.

The coordinate detector 82 detects the coordinates of a contact point, which is a point that the upper conductive film and the lower conductive film of the touch panel are contacted. The determination part 83 determines whether the contact point is one point or two points. The distance calculator 84 calculates the distance between two contact points. The 2 point calculator 85 calculates the coordinates of each of the two contact points. The direction detector 86 detects the direction in which the two contact points are arranged. The coordinate detector 82, the determination part 83, the distance calculator 84, the 2 point calculator 85, and the direction detector 86 each perform a process based the digital voltage data converted by the AD convertor 87.

The controller 80 is, for example, a microprocessor. In this case, the function of each of the coordinate detector 82 coordinate detector 82, the determination part 83, the distance calculator 84, the 2 point calculator 85, and the direction detector 86 direction detector 86 can be implemented by the controller 80 that executes a program stored in the storage part 88.

Figure 2:
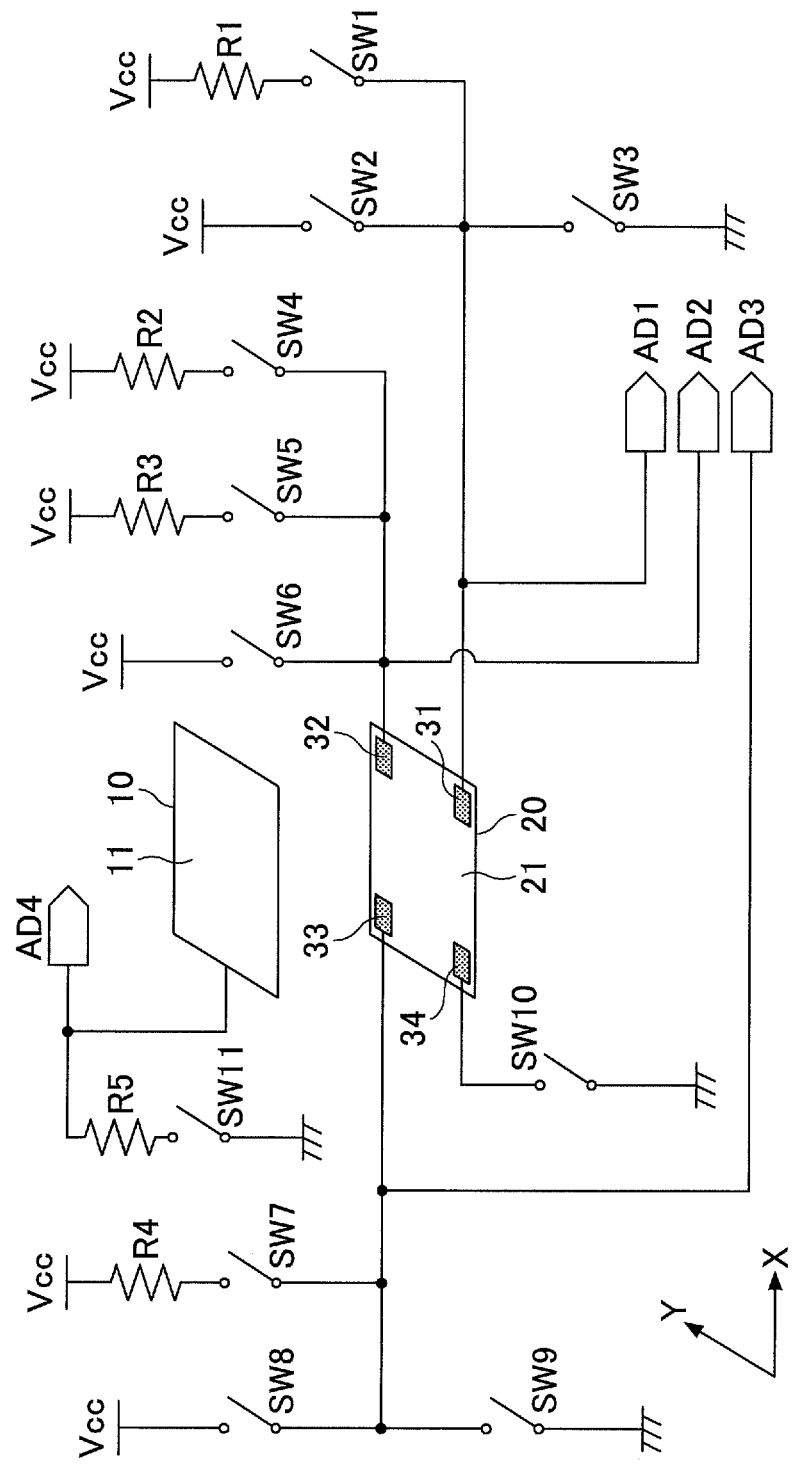
FIG. 2 is a diagram illustrating the touch panel of the first embodiment.

A touch panel 200 that is included in the touch panel apparatus is described in detail with reference to FIG. 2. A transparent conductive film 11 (e.g., ITO (Indium Tin Oxide)) is formed on a surface of the upper electrode substrate 10. A transparent conductive film 21 (e.g., ITO) is formed on a surface of the lower electrode substrate 20. The upper electrode substrate 10 and the lower electrode 21 are placed in a state facing each other.

A first power-feed terminal 31, a second power-feed terminal 32, a third power-feed terminal 33, and a fourth power-feed terminal 34 are provided on one of four corners of the conductive film 21, respectively. In this embodiment, the first power-feed terminal 31, the second power-feed terminal 32, the third power-feed terminal 33, and the fourth power-feed terminal 34 are formed, so that a line connecting the first power-feed terminal 31 and the second power-feed terminal 32 and a line connecting the third power-feed terminal 33 and the fourth power-feed terminal are parallel to the Y-axis. Further, a line connecting the first power-feed terminal 31 and the fourth feed material 34 and line connecting the second feed material 33 and the third power-feed terminal 39 are parallel to the X-axis.

A first switch SW1 is connected between the first power-feed terminal 31 and a first resistor R1 serving as a voltage divider. The resistor R1 is also connected to a power source Vcc. A second switch SW2 is connected between the first power-feed terminal 31 and the power source Vcc. A third switch SW3 is connected between the first power-feed terminal 31 and a ground potential (0V). A first measuring part AD1 that is connected to the first power-feed terminal 31 measures the potential of the first power-feed terminal 31.

It is to be noted that "measuring part AD1" is a term that collectively refers to the elements in the controller 80 functioning to measure the potential of the first power-feed terminal 21. In this embodiment, the measuring part AD1 includes the AD convertor 87. The output of the first power-feed terminal 31 is input to the AD convertor 87. The same also applies to the AD conversion parts AD2 to AD4.

A fourth switch SW4 is connected between the second power-feed terminal 32 and a second resistor R2 serving as a voltage divider. The resistor R2 is also connected to the power source Vcc. A fifth switch SW5 is connected to the second power-feed terminal 32 and a third resistor R3 serving as a voltage divider. The resistor R3 is also connected to the power source Vcc. A sixth switch SW6 is connected to the second power-feed terminal 32 and the power source Vcc. The measuring part AD2 that is connected to the second power-feed terminal 32 measure the potential of the second power-feed terminal 32.

A seventh switch SW7 is connected between the third power-feed terminal 33 and a fourth resistor R4 serving as a voltage divider. The resister R4 is connected to the power source Vcc. An eighth switch SW8 is connected to the third power-feed terminal 33 and the power source Vcc. A ninth switch SW9 is connected to the third power-feed terminal 33 and a ground potential (0V). The third potential measurement part AD3 that is connected to the third power-feed terminal AD3 measures the potential of the third power-feed terminal AD3.

A tenth switch SW10 is connected to the fourth power-feed terminal 34 and to a ground potential (0V).

A fifth resistor R5 serving as a voltage divider is connected to the conductive film 11 and an eleventh switch SW11. The switch SW11 is connected to a ground potential (0V). The measuring part AD4 that is connected to the conductive film 11 measures the potential of the conductive film 11.

The resistance value of the resistor R1 and the resistance value of the resistor R2 are the same. Similarly, the resistance value of the resistor R3 and the resistance value of the resistor R4 are the same.

<Detection of a Middle Point>

Figure 3:
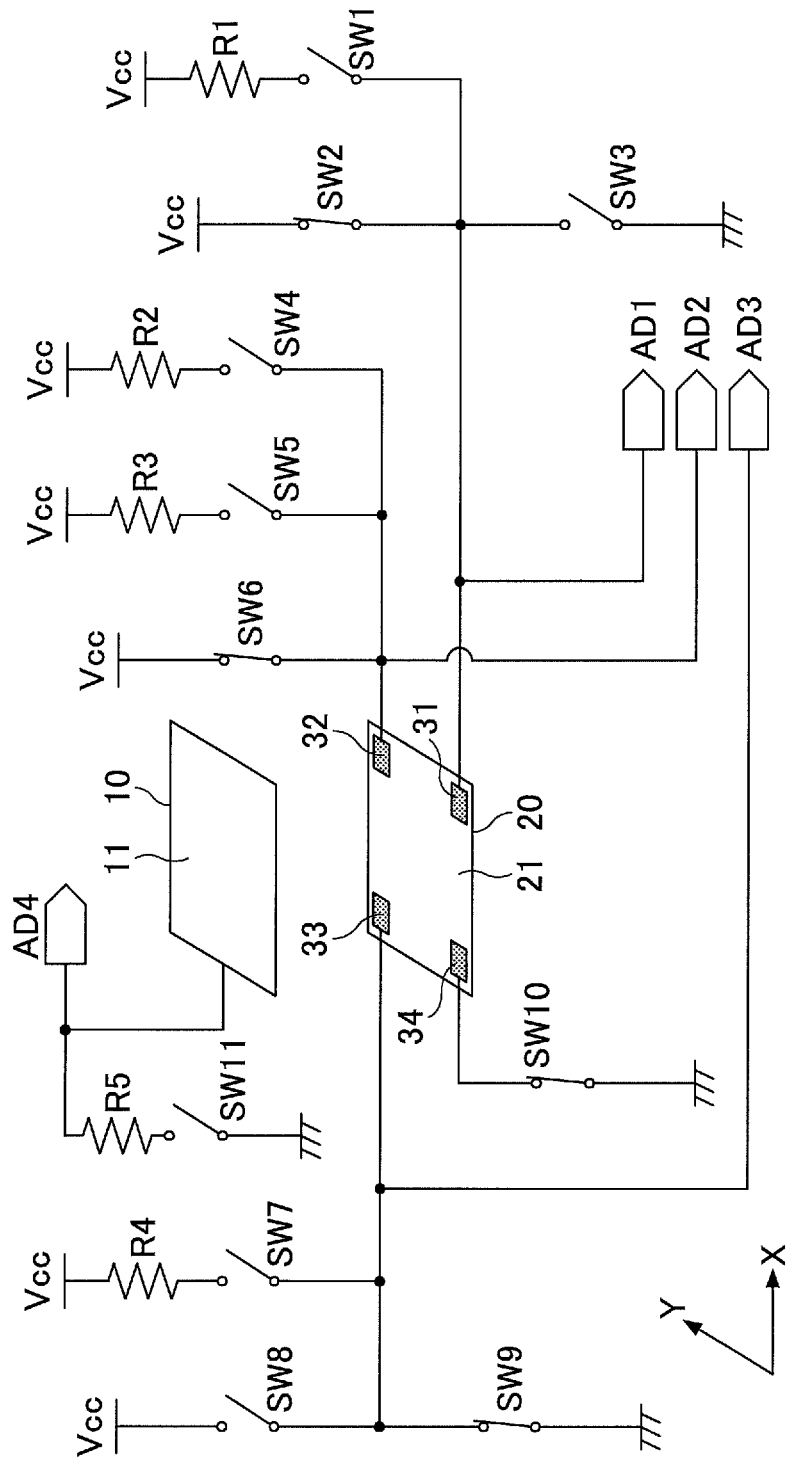
FIG. 3 is an explanatory diagram illustrating the touch panel of the first embodiment.

When detecting the X coordinate of a contact point with the touch panel 200, the switch SW2, the switch SW6, the switch SW9, and the switch SW10 are switched on whereas the switch SW1, the switch SW3, the switch SW4, the switch SW5, the switch SW7, the switch SW8, and the switch SW11 are switched off as illustrated in FIG. 3, so that a potential distribution is generated on the conductive film 21 in the X-direction of the conductive film 21 and the measuring part AD4 measures the potential.

Figure 4:
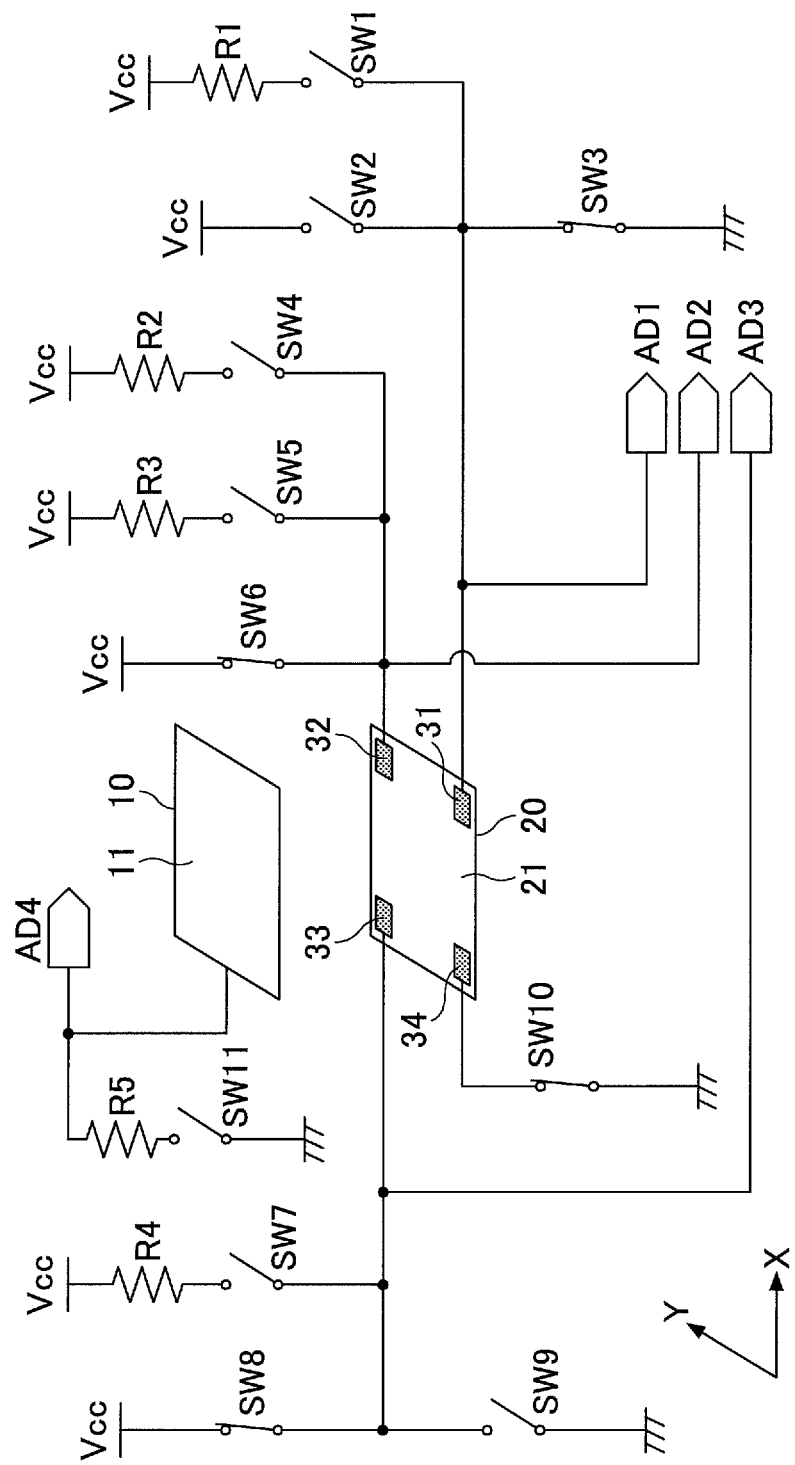
FIG. 4 is an explanatory diagram illustrating the touch panel of the first embodiment.

When detecting the Y coordinate of a contact point with the touch panel 200, the switch SW3, the switch SW6, the switch SW8, and the switch SW10 are switched on whereas the switch SW1, the switch SW2, the switch SW4, the switch SW5, the switch SW7, the switch SW9, and the switch SW11 are switched off as illustrated in FIG. 4, so that a potential distribution is generated on the conductive film 21 in the Y-direction of the conductive film 21 and the measuring part AD4 measures the potential.

In a case where the contact point is one point, the detected X coordinate and Y coordinate represent the coordinates of the single contact point. In a case where the contact points are two points, the detected X coordinate and Y coordinate represent the coordinates of the middle point of the two points.

Next, the detection of two contact points is described. When detecting an operation performed on the touch panel apparatus where the contact points are two points, a potential distribution is generated on the conductive film 21 in the X direction and in the Y direction of the conductive film 21. The following processes are performed after two points are detected.

Figure 5:
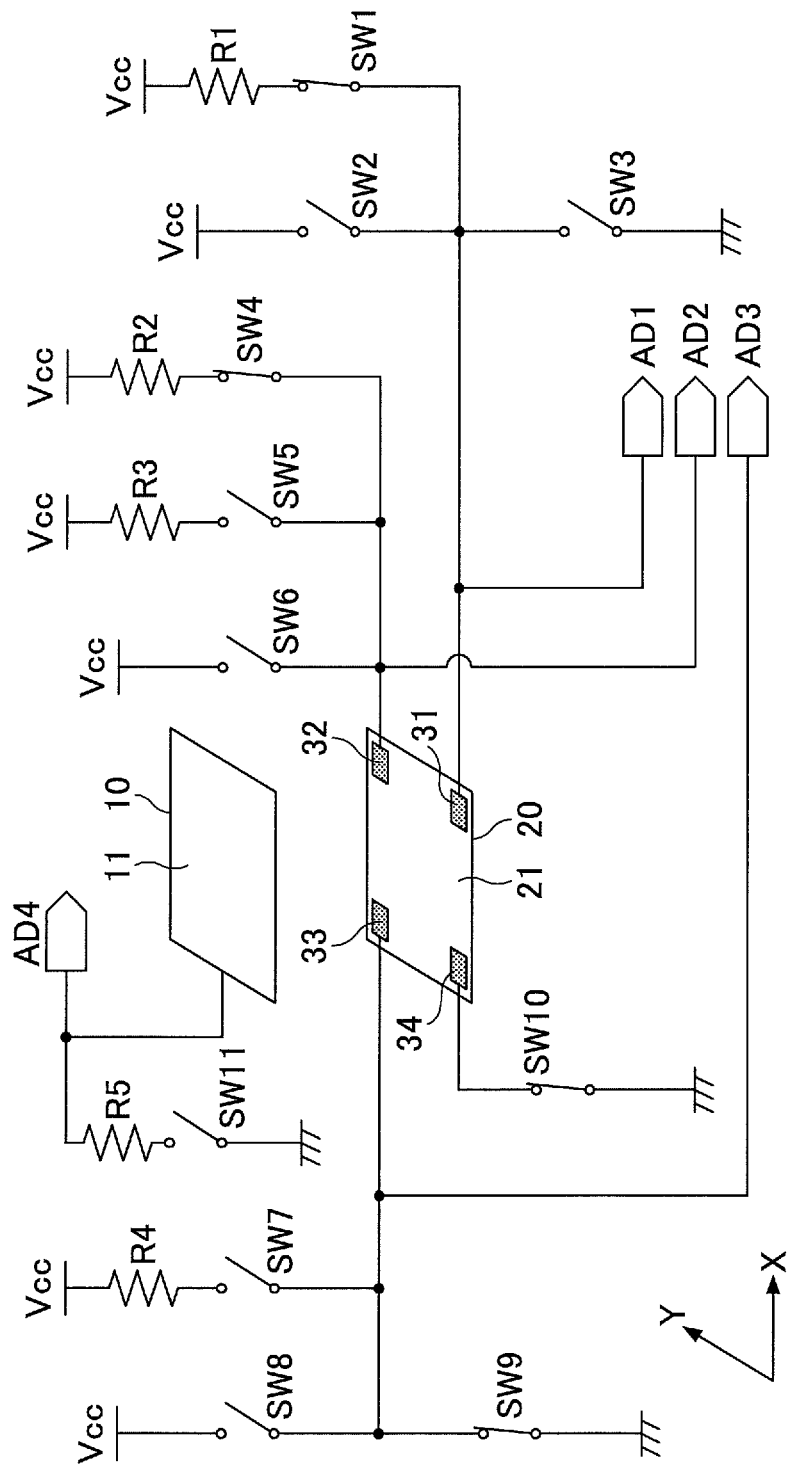
FIG. 5 is an explanatory diagram illustrating the touch panel of the first embodiment.

When generating a potential distribution on the conductive film 21 in the X-direction of the conductive film 21, the switch SW1, the switch SW4, the switch SW9, the switch SW10 are switched on whereas the switch SW2, the switch SW3, the switch SW5, the switch SW6, the switch SW7, the switch SW8, and the switch SW11 are switched off as illustrated in FIG. 5. The voltage Vcc is applied to the first power-feed terminal 31 and the second power-feed terminal 32 via the resistor R1 and the resistor R2, respectively. The measuring part AD1 and the measuring part AD2 measure the potential in the state where the potential distribution is generated on the conductive film 21 in the X-direction of the conductive film 21.

Figure 6:
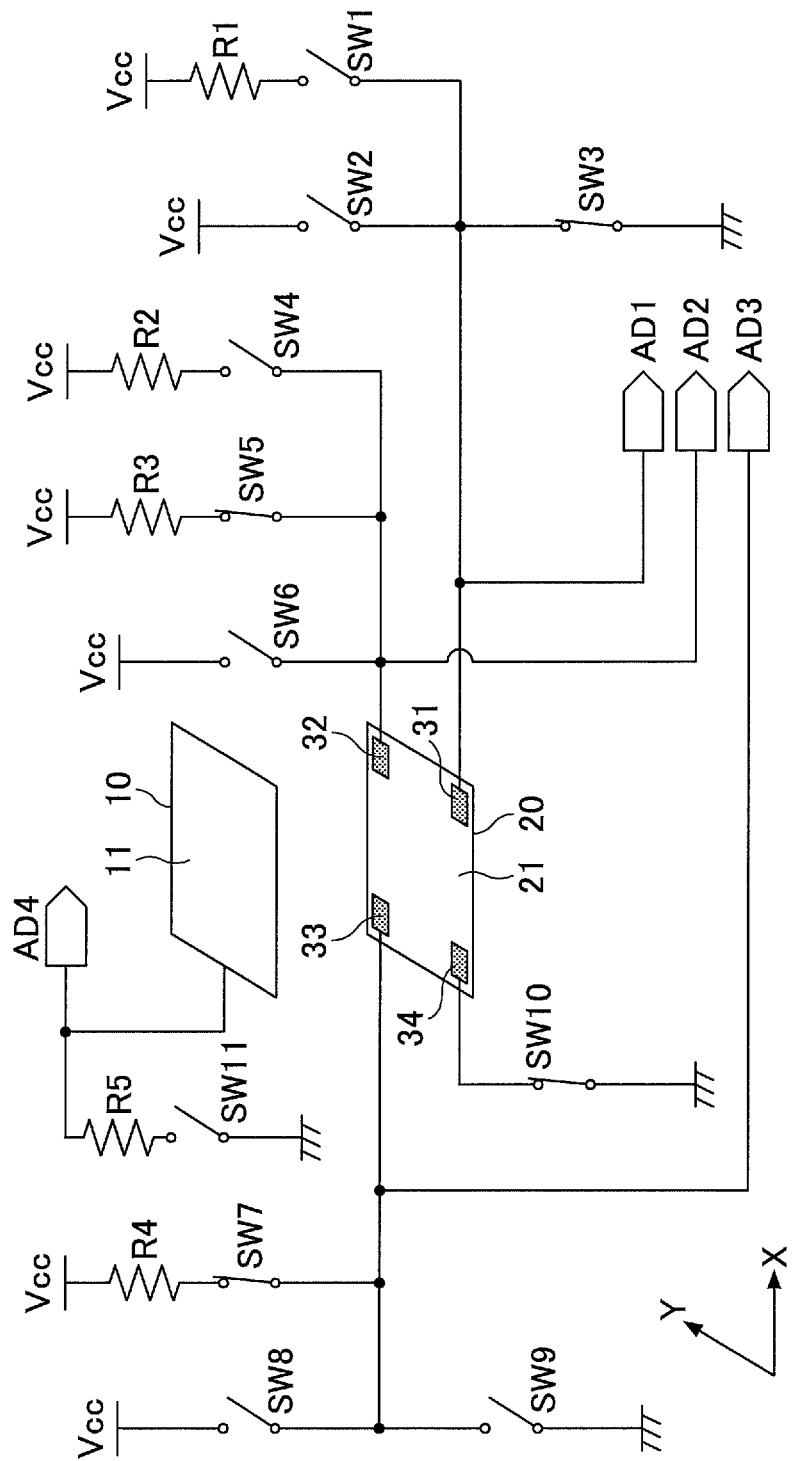
FIG. 6 is an explanatory diagram illustrating the touch panel of the first embodiment.

When generating a potential distribution on the conductive film 21 in the Y-direction of the conductive film 21, the switch SW3, the switch SW5, the switch SW7, the switch SW10 are switched on whereas the switch SW1, the switch SW2, the switch SW4, the switch SW6, the switch SW8, the switch SW9, and the switch SW11 are switched off as illustrated in FIG. 6. The voltage Vcc is applied to the second power-feed terminal 32 and the third power-feed terminal 33 via the resistor R3 and the resistor R4, respectively. In this state where the potential distribution is generated on the conductive film 21, the measuring part AD2 and the measuring part AD3 measure the potential.

A gesture operation (pinch out/in operation) that is performed for, for example, increasing or reducing the size of an image displayed on a display is performed by widening or narrowing the distance between two contact points on the touch panel.

The positional relationship between two contact points on the touch panel 200 is described with reference to 4 patterns S1, S2, S3, and S4 illustrated in FIG. 7. The pattern S1 is a pattern in which two points are separated along the X-direction (horizontal direction). The pattern S2 is a pattern in which two points are separated along a diagonal line extending from an upper left to a lower right. The pattern S3 is a pattern in which two points are separated along the Y-direction (vertical direction). The pattern S4 is a pattern in which two points are separated along a diagonal line extending from an upper right to a lower left.

FIGS. 8 to 11 illustrate a relationship of a distance between two contact points and a potential difference $\Delta V$ between a measured potential and a reference potential. In this embodiment, the reference potential is a divided potential of the power-feed terminal measured when the touch panel 200 is in an untouched state. In FIGS. 8 to 11, "AD1 (X)" indicates a potential difference between a divided potential of the first power-feed terminal 31 measured by the measuring part AD1 and the reference potential of the first power-feed terminal 31 when the potential distribution is generated on the conductive film 21 in the X-direction of the conductive film 21 via the resistor R1 and the resistor R2 as illustrated in FIG. 5. "AD2 (X)" indicates a potential difference between a potential of the second power-feed terminal 32 measured by the measuring part AD2 and the reference potential of the second power-feed terminal 32 when the potential distribution is generated on the conductive film 21 in the X-direction of the conductive film 21 as illustrated in FIG. 5. Further, "AD2 (Y)" indicates a potential difference between a potential of the second power-feed terminal 32 measured by the measuring part AD2 and the reference potential of the second power-feed terminal 32 when the potential distribution is generated on the conductive film 21 in the Y-direction of the conductive film 21 via the resistor R3 and the resistor R4 as illustrated in FIG. 6. "AD3 (Y)" indicates a potential difference between a potential of the third power-feed terminal 33 measured by the measuring part AD3 and the reference potential of the third power-feed terminal 33 when the potential distribution is generated on the conductive film 21 in the Y-direction of the conductive film 21 as illustrated in FIG. 6.

Figure 7:
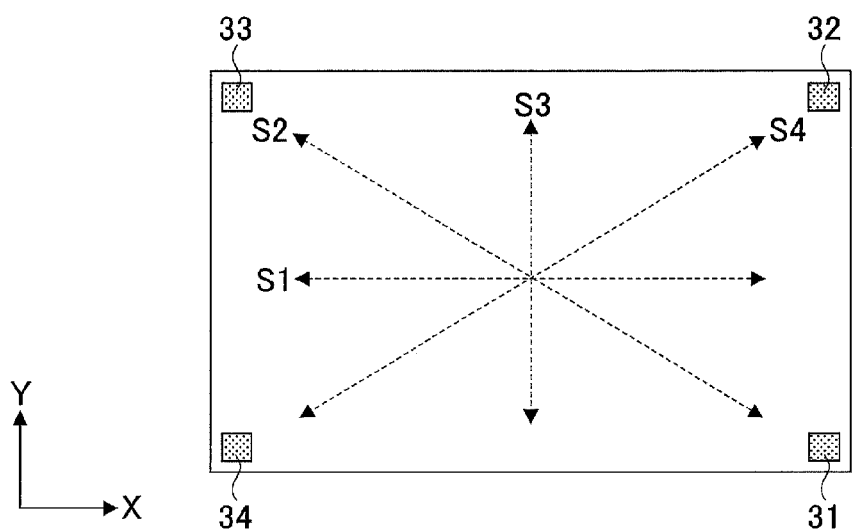
FIG. 7 is an explanatory diagram illustrating four patterns for two points contacting the touch panel of the first embodiment.
Figure 8:
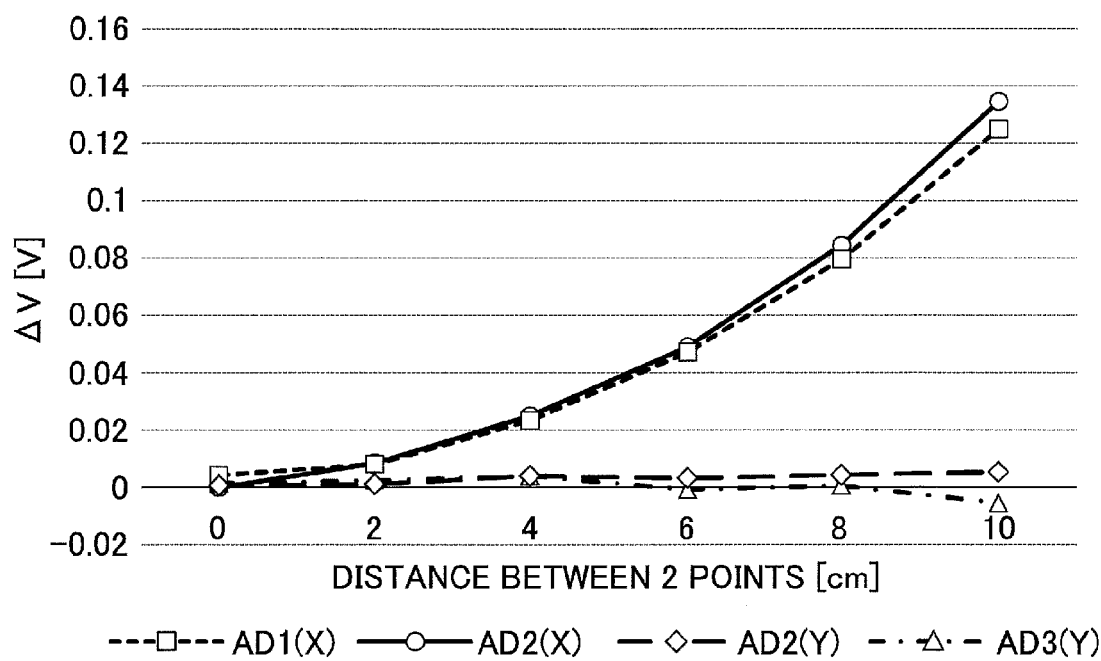
FIG. 8 is a diagram illustrating the correlation between a distance between two points of pattern S1 and a potential difference $\Delta V$.

FIG. 8 is a graph illustrating the changes of the potential difference $\Delta V$ when the distance between two contact points is changed in the directions of pattern S1 of FIG. 7. In the case of the pattern S1, the potential difference $\Delta V$ increases as the distance between two contact points becomes wider in X-direction in "AD1 (X)" and "AD2 (X)" of FIG. 8. On the other hand, because the distance between the two contact points in Y-direction is substantially 0, the potential difference $\Delta V$ in each of "AD2 (Y)" and "AD3 (Y)" hardly changes (approximately 0V) even when the distance between the two contact points becomes wider in the X-direction. The potential difference AD1 (X) and the potential difference AD2 (X) have tend to change in a similar manner when the distance between the two contact points are widened.

Figure 9:
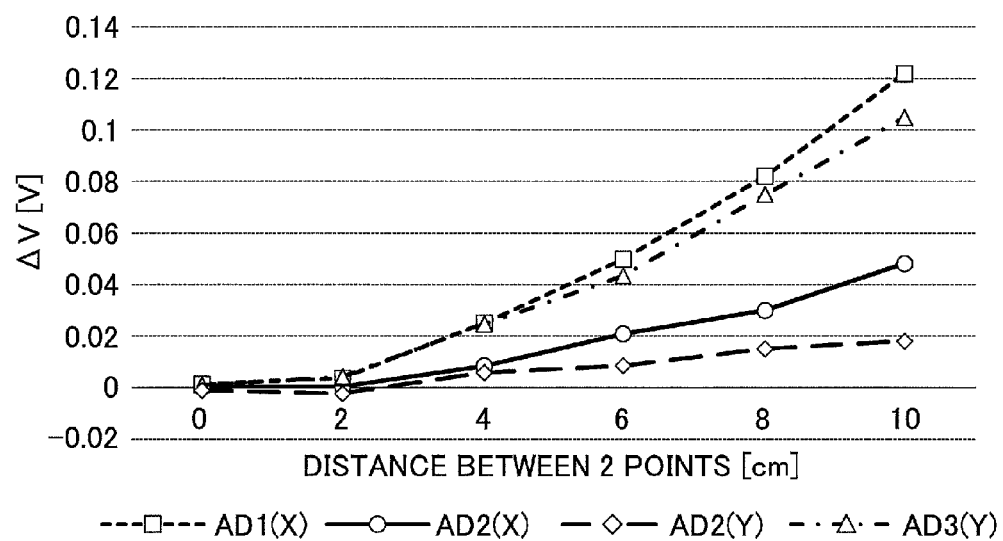
FIG. 9 is a diagram illustrating the correlation between a distance between two points of pattern S2 and a potential difference $\Delta V$.

FIG. 9 is a graph illustrating the changes of the potential difference $\Delta Y$ when the distance between two contact points is changed in the directions of pattern S2 of FIG. 7. In the case of the pattern S2, the distance between the two contact points changes in both the X-direction and the Y-direction. Because the pattern S2 is positioned substantially on the line connecting the first power-feed terminal 31 and the third power-feed terminal 33 in FIG. 7, the potential difference measured by the measuring part AD1 or the potential difference measured by the measuring part AD3 changes in a more significant manner than the potential difference measured by the measuring part AD2 when the distance between the two contact points is changed along the pattern S2. Therefore, when the distance between the two contact points becomes wider, the change of potential difference ΔV becomes larger in an order of AD2 (Y), AD2 (X), AD3 (Y), and AD1 (X) as illustrated in FIG. 9. More specifically, although each of the potential differences AD1 (X) and AD3 (Y) change in a more significant manner, each of the potential differences AD2 (X) and AD2 (Y) change in a less significant manner when the distance between the two contact points becomes wider.

Figure 10:
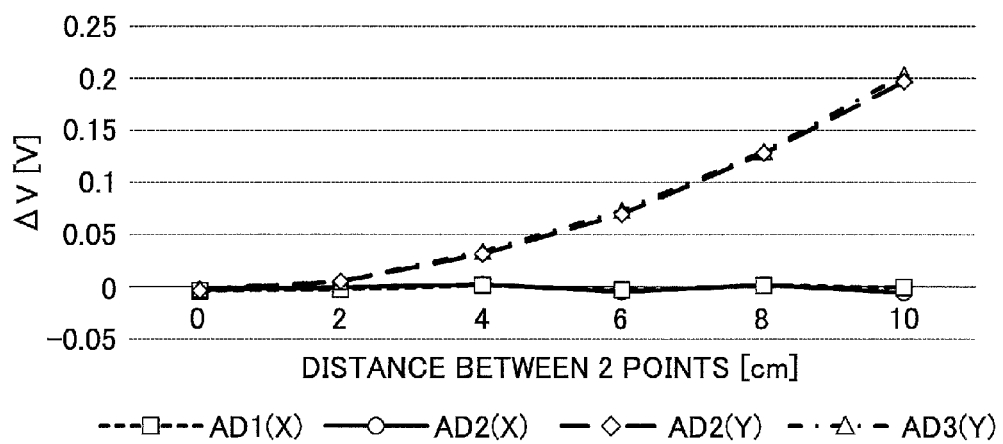
FIG. 10 is a diagram illustrating the correlation between a distance between two points of pattern S3 and a potential difference $\Delta V$.

FIG. 10 is a graph illustrating the changes of the potential difference ΔV when the distance between two contact points is changed in the directions of pattern S3 of FIG. 7. In the case of the pattern S3, the potential difference ΔV increases as the distance between two contact points becomes wider in the Y-direction in "AD2 (Y)" and "AD3 (Y)" of FIG. 10. On the other hand, because the distance between the two contact points in the X-direction is substantially 0, the potential difference ΔV hardly changes (approximately 0V) even when the distance between the two contact points becomes wider in the direction along the pattern S3 in "AD1 (X)" and "AD2 (X)". The potential difference AD2 (Y) and the potential difference AD3 (Y) tend to change in a similar manner when the distance between the two contact points are widened.

Figure 11:
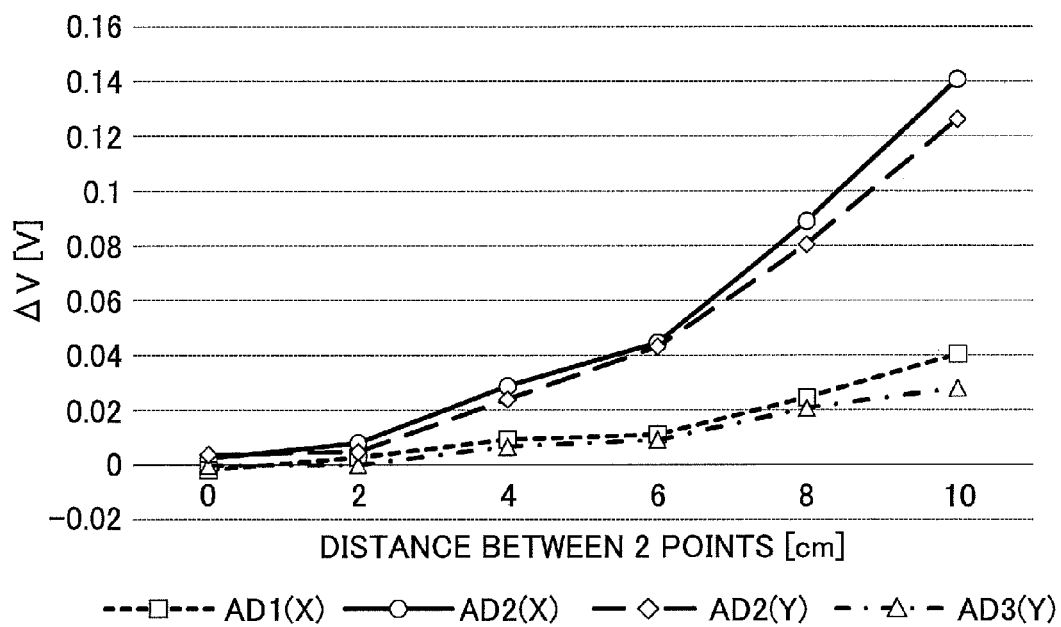
FIG. 11 is a diagram illustrating the correlation between a distance between two points of pattern S4 and a potential difference $\Delta V$.

FIG. 11 is a graph illustrating the changes of the potential difference ΔV when the distance between two contact points is changed in the directions of pattern S4 of FIG. 7. In the case of the pattern S4, the change of potential difference ΔV becomes larger in an order of AD3 (Y), AD1 (X), AD2 (Y), and AD2 (X) as illustrated in FIG. 11. More specifically, each of the potential differences AD2 (X) and AD2 (Y) changes in a more significant manner, but each of the potential differences AD1 (X) and AD3 (Y) changes in a less significant manner when the distance between the two contact points becomes wider.

As illustrated in FIGS. 8 to 11, each of the potential differences AD1 (X), AD2 (X), AD2 (Y), and AD3 (Y) exhibit values corresponding to the distance between the two contact points in the X-direction and the distance between the two contact points in the Y-direction. Therefore, the distance between two contact points can be derived by referring to each value of the potential differences AD1 (X), AD2 (X), AD2 (Y), and AD3 (Y) when there are two contact points.

Next, the reason that the potential difference ΔV becomes larger as the distance between two contact points becomes greater is described with the example illustrated in FIG. 5 in which the conductive film 11 on the upper side and the conductive film 21 on the lower side contact at two points in a state where potential distribution is generated on the conductive film 21 in the X-direction of the conductive film 21 via the resistor R1 and the resistor R2.

Figure 12:
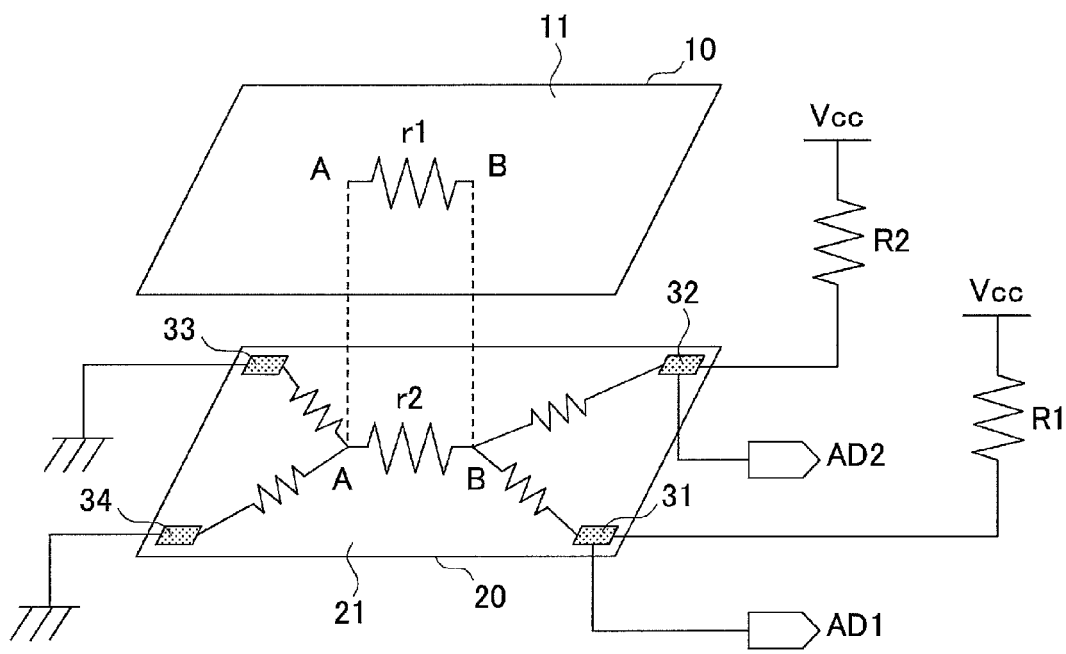
FIG. 12 is an explanatory diagram illustrating the generation of a potential difference $\Delta V$.

In this state, the conductive film 11 and the conductive film 12 contact at two contact points A and B as illustrated in FIG. 12. Accordingly, a combined resistance of the resistance r1 of the conductive film 11 and the resistance r2 of the conductive film 21 being connected in parallel is generated between the contact point A and the contact point B. The value of the combined resistance between the contact point A and the contact point B becomes less than the resistance value of the resistor r2 of the conductive film 21 and the resistance value of the resistor r1 of the conductive film 11.

In addition, the resistance of the touch panel 200 between the first power-feed terminal 31 and a power-feed terminal at the ground potential being serially connected to the combined resistance also decreases. Therefore, the divided potential measured by the measuring part AD1, (the voltage of the power source Vcc divided by the resistance of the touch panel 200 between the first power-feed terminal 31 and ground potential and the resistance of the first resistor R1) when two contact points exist becomes less than the divided potential that is measured by the measuring part AD1 when the contact point is a single point.

Further, the resistance of the touch panel 200 between the first power-feed terminal 31 and the power-feed terminal at the ground potential decreases as the distance between the contact point A and the contact point B increases, because the proportion of the combined resistance relative to the resistance between the first power-feed terminal and the power-feed terminal at the ground potential increases. Accordingly, the potential measured by the measuring part AD1 also decreases, and the potential difference ΔV measured when a distance between the contact point A and the contact point B is increasing becomes larger compared to the potential difference ΔV measured when the contact point A and the contact point B become closer toward each other.

Similarly, the resistance of the touch panel 200 between the second power-feed terminal 32 and the power-feed terminal at the ground potential (including the combined resistance) also decreases. Accordingly, the potential measured by the measuring part AD2, that is, the divided potential detected from the second power-feed terminal 32 (the voltage of the power source Vcc divided by the resistance of the touch panel 200 between the second power-feed terminal 32 and the ground potential and the resistance of the second resistor R2) decreases. Further, the resistance of the touch panel 200 between the second power-feed terminal 32 and the power-feed terminal at ground potential decreases as the distance between the contact point A and the contact point B increases. Accordingly, the potential measured by the measuring part AD2 decreases, and the potential difference ΔV becomes larger compared to the potential difference ΔV measured when the contact point A and the contact point B become closer toward each other.

The same applies to a case where potential distribution is generated on the touch panel in the Y-direction of the touch panel 200 via resistors.

The divided potential detected from the first power-feed terminal 31 or the second power-feed terminal 32 when the contact point A and the contact point B are extremely close to each other becomes close to the divided voltage measured when the contact point is a single point, because the proportion of the combined resistance between two contact points relative to the resistance between the first or second power-feed terminal 31, 32 and the power-feed terminal at the ground potential becomes extremely low when the contact point A and the contact point B are close to each other. Therefore, the potential difference ΔV measured by the measuring part AD1 and the potential difference ΔV measured by the measuring part AD2 may in some cases be approximately 0V when the two contact points are extremely close to each other.

<Position Detection Method>

Figure 13:
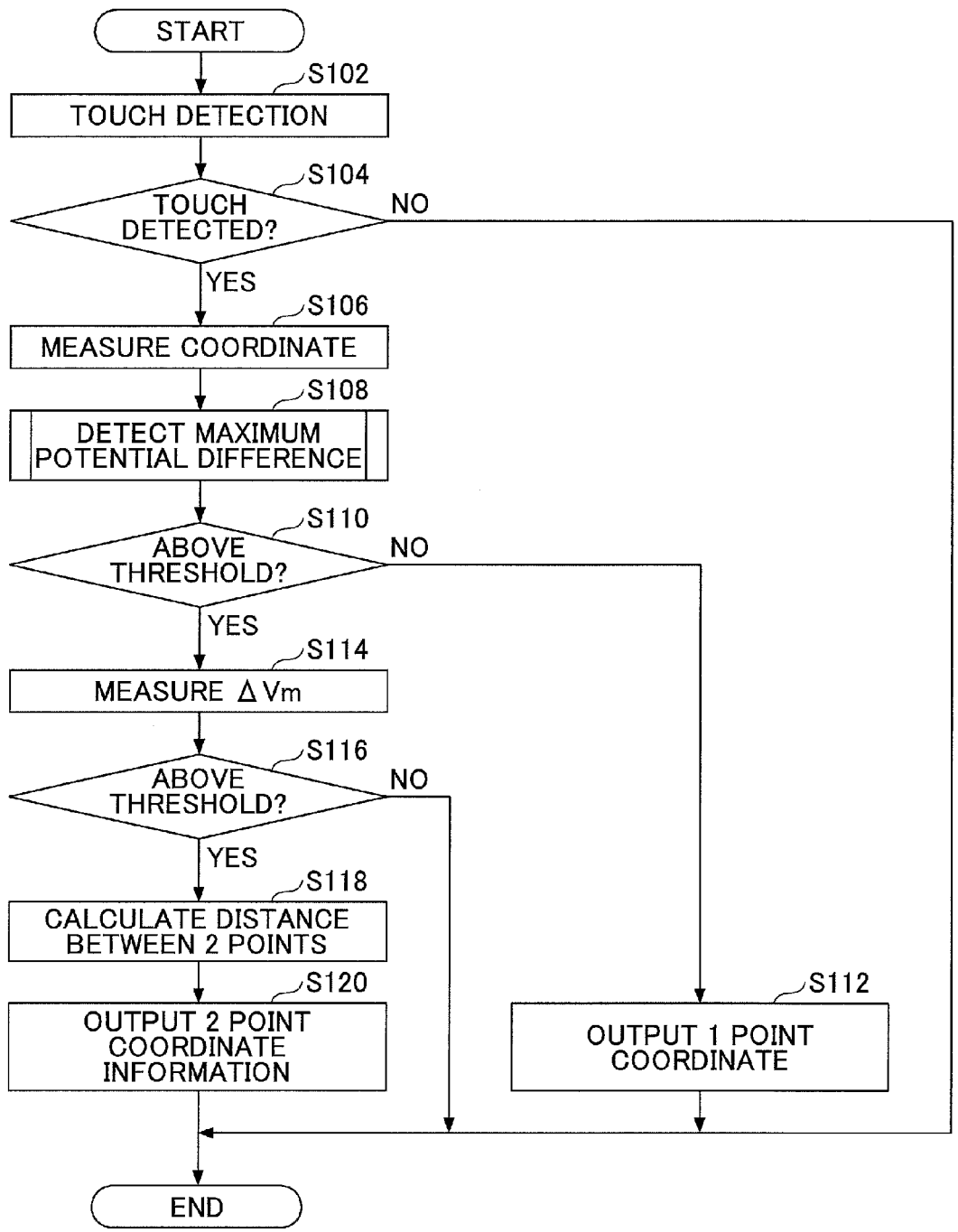
FIG. 13 is a flowchart illustrating a detection method of the first embodiment.

Next, a method for detecting a position of a contact point of the touch panel apparatus of this embodiment is described with reference to FIG. 13. The position detection method of this embodiment is performed in a case of, for example, determining whether an operation such as pinch-out or pinch-in is performed. The processes described herein in connection with flow charts are implemented by the controller.

Figure 14:
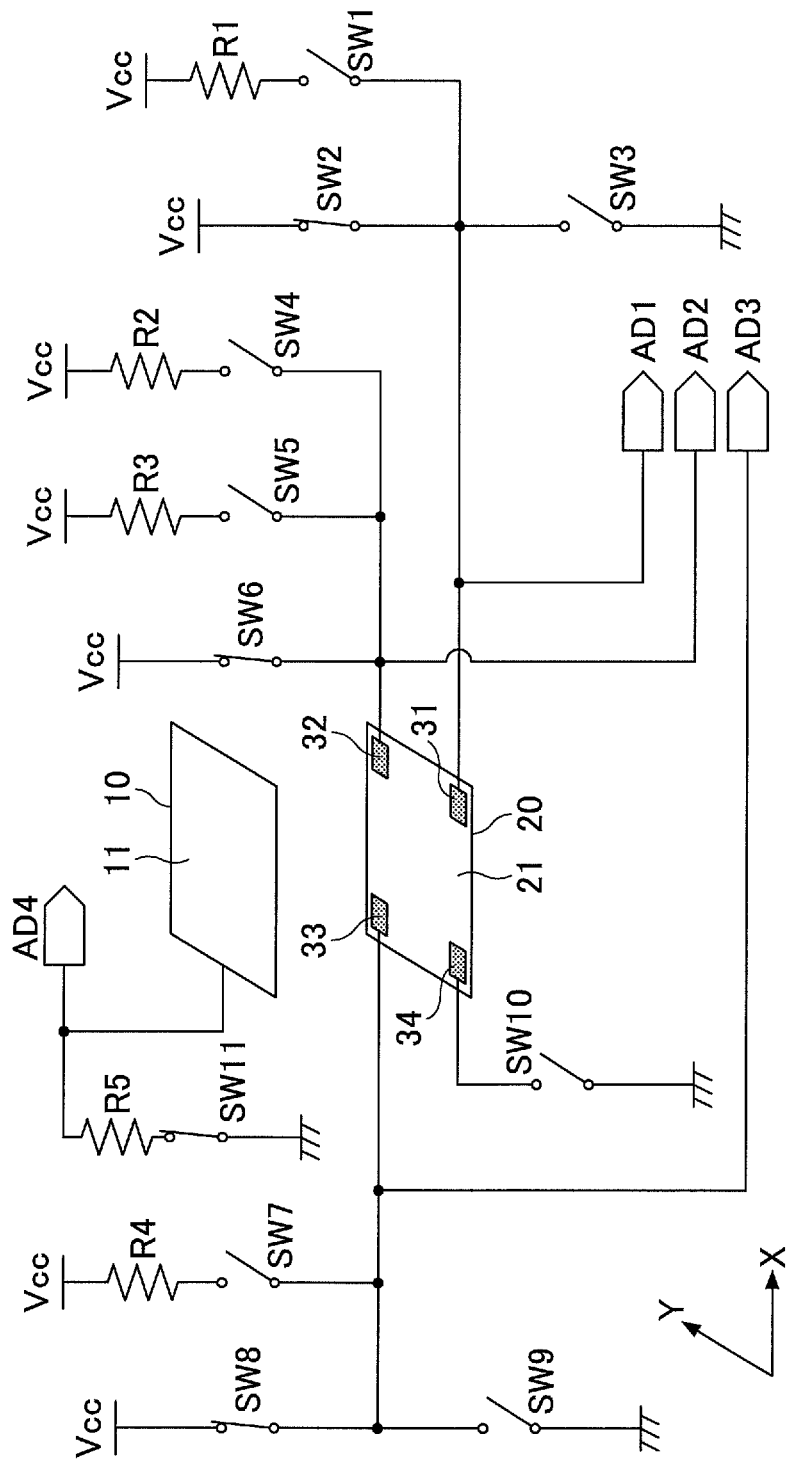
FIG. 14 is an explanatory diagram for describing the detection method of the first embodiment.

In Step S102, a touch-on detection process for detecting a touch operation on the touch panel 200 is conducted. The touch-on detection process is conducted by measuring the potential with the measuring part AD4 in a state where the switch SW2, the switch SW6, the switch SW8, the switch SW11 are switched on whereas the switch SW1, the switch SW3, the switch SW4, the switch SW5, the switch SW7, the switch SW9, and the switch SW10 are switched off as illustrated in FIG. 14. In this state, the potential of each of the first power-feed terminal 31, the second power-feed terminal 32, and the third power-feed terminal 33 is Vcc.

When detecting a touch-on operation, two switches among the switch SW2, the switch SW6, and the switch SW8 may be switched on to set the potential of two terminals among the first power-feed terminal 31, the second power-feed terminal 32, and the third power-feed terminal 33 to Vcc. Alternatively, one switch among the switch SW2, the switch SW6, and the terminal SW8 may be switched on to set the potential of one terminal among the first power-feed terminal 31, the second power-feed terminal 32, and the third power-feed terminal 33 to Vcc.

Then, in Step S104, it is determined whether a touch-on operation is being performed. When a finger or a pen is contacting the touch panel 200, the conductive film 11 and the conductive film 12 would be contacting each other. Accordingly, the potential in which the power source Vcc is divided by the resistance of the conductive film 11 and the resistor R5 is detected by the measuring part AD4. Thus, when the potential is detected by the measuring part AD4, it is determined that a touch-on operation is performed on the touch panel 200, in other words, a touch is detected, and the flow of FIG. 13 proceeds to Step S106. If no potential is detected by the measuring part AD4, it is determined that a touch is not detected, and the flow of FIG. 13 is ended.

In Step S106, a coordinate of the contact point is measured. In this case, a potential distribution is generated in the X-direction of the conductive film 21 to allow the measuring part AD4 to measure the potential as illustrated in FIG. 3. Then, the coordinate detector 82coordinate detector 82 detects the X-coordinate of the contact point based on the potential measured by the measuring part AD4.

Similarly, a potential distribution is generated on the conductive film 21 in the Y-direction of the conductive film 21 to allow the measuring part AD4 to measure the potential as illustrated in FIG. 4. Then, the coordinate detector 82 coordinate detector 82 detects the Y-coordinate of the contact point based on the potential measured by the measuring part AD4. Thereby, the X coordinate and the Y coordinate of the contact point are detected. In a case where the contact point is one point, the detected X coordinate and the Y coordinate indicate the coordinates of the contact point. In a case where the contact point is two points, the detected X-coordinate and the Y-coordinate indicate the coordinates of the middle point of the two contact points.

Then, in Step S108, the maximum potential difference ΔVm is detected. The term "maximum potential difference ΔVm" refers to the highest value of voltage difference between a reference potential and the potential detected by each of the measuring parts AD1 to AD3. The detection of the maximum potential difference ΔVm is described in further detail with reference to the below-described subroutine.

Then, in Step S110, the determination part 83 determines whether the maximum potential difference ΔVm obtained in Step S108 is greater than a threshold ΔVth. The threshold ΔVth is a criterion for determining whether the contact point on the touch panel 200 is one point or two points. In a case where the maximum potential difference ΔVm is less than the threshold ΔVth, the contact point is determined to be one point, and the flow of FIG. 13 proceeds to Step S112. In a case where the maximum potential difference ΔVm is greater than the threshold ΔVth, the contact point is determined to be two points, and the flow of FIG. 13 proceeds to Step S114.

When it is determined that the contact point is one point (S112), the coordinates detected in Step S106 are output as the coordinates of the contact point.

On the other hand, in a case where the maximum potential difference ΔVm is determined to be greater than the threshold ΔVth in Step S110, the maximum potential difference ΔVm is measured once again in Step S114. When obtaining the maximum potential difference ΔVm in S114 a potential distribution in the conductive film 21 is generated by connecting the switches under the same conditions as when the maximum potential difference ΔVm is obtained in S108, and the potential is measured by the measuring parts that have obtained the maximum potential difference ΔVm in Step S108. The maximum potential difference ΔVm is measured twice for detecting a gesture operation based on the information touched(?) on the touch panel 200.

Then, in Step S116, it is determined whether the maximum potential difference ΔVm measured in S114 is greater than the threshold ΔVth. In a case where the maximum potential difference ΔVm measured in S114 is less than the threshold ΔVth, the measured potential is determined as an error, and the flow of FIG. 13 is ended. In a case where the maximum potential difference ΔVm measured in S114 is greater than the threshold ΔVth, the contact point is determined to be two points, and the flow of FIG. 13 proceeds to Step S118.

Then, in Step S118, the distance between two contact points is calculated. The distance calculator 84 calculates the distance L between the two contact points by using the below-described Expression (1) or Expression (2) based on the maximum potential difference ΔVm. In Expression (1), "α1", "β1", and "γ1" are proportional coefficients. In Expression (2), "α2" and "β2" are proportional coefficients.

Figure 15:
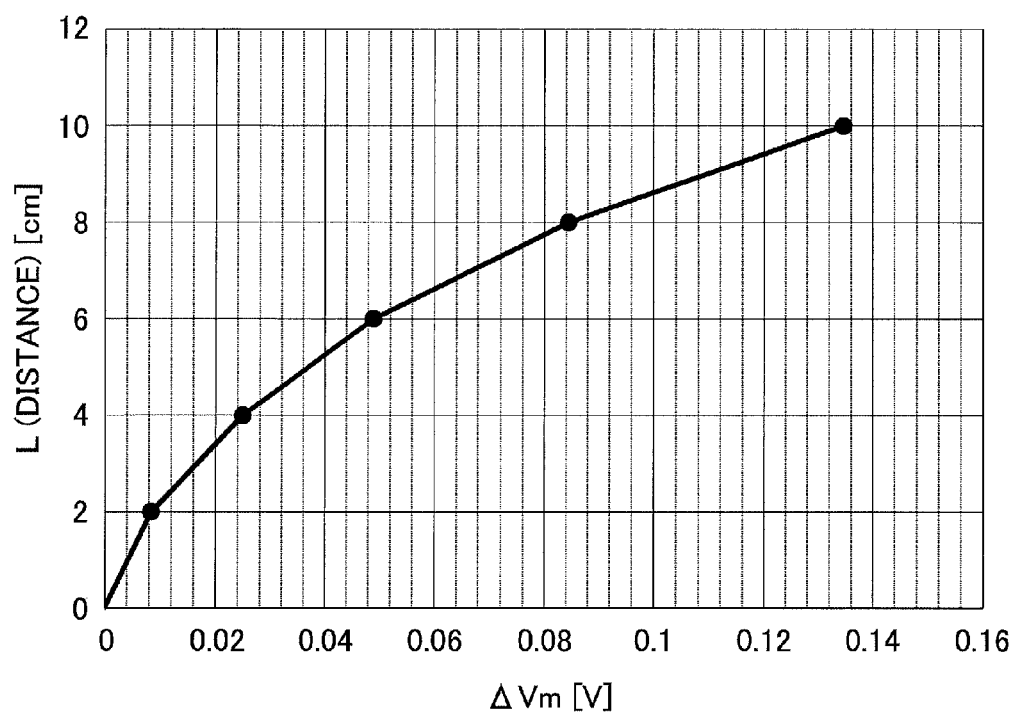
FIG. 15 is an explanatory diagram for describing the detection method of the first embodiment.

Alternatively, the distance L between two contact points may be calculated based on, for example, a graph illustrating the correlation between the maximum potential difference ΔM and the distance L as illustrated in FIG. 15. The graph of FIG. 15, which corresponds to the graph of FIG. 8 by converting the vertical axis and the horizontal axis, is stored in, for example, the storage 88.

$$L = \alpha_1 \times (\Delta Vm)^2 + \beta_1 \times \Delta Vm + \gamma_1 \qquad \text{<Expression (1)>}$$

$$L = \alpha_2 \times \sqrt{\Delta Vm} + \beta_2 \times \Delta Vm \qquad \text{<Expression (2)>}$$

Then, in Step S120, coordinate data of the two contact points is output. The two point calculator 85 calculates the coordinate data of each of the two contact points based on the distance between the two contact points in the X-direction or the Y-direction obtained in Step S118 and the coordinates detected in Step S106, and outputs the calculated coordinate data.

For example, when calculating the X-coordinates of the two contact points, the X-coordinates of one contact point is calculated by adding the X-coordinates detected in Step S106 with half the value of the distance between the two contact points obtained in Step S118. The X-coordinates of the other contact point is calculated by subtracting half the value of the distance between the two contact points obtained in Step S118 from the X-coordinates detected in Step S106. The Y-coordinates of the two contact points are assumed as the Y-coordinates detected in Step S106. Further, the coordinates of a middle point between the two contact points and the distance between the two contact points may be used as output data instead of the coordinates of the two contact points.

When calculating the Y-coordinates of the two contact points, the Y-coordinates of one contact point is calculated by adding the Y-coordinates detected in Step S106 with half the value of the distance between the two contact points obtained in Step S118. The Y-coordinates of the other contact point is calculated by subtracting half the value of the distance between the two contact points obtained in Step S118 from the Y-coordinates detected in Step S106. The X-coordinates of the two contact points are assumed as the X-coordinates detected in Step S106.

By performing the above-described process, the distance and coordinates of contact points can be obtained in a case where the contact point in the touch panel 200 is two points, and a multi-touch operation can be detected even a five-wire type touch panel is used.

By repeating the above-described process and observing the change of the distance between the two contact points, it can be determined whether the operation performed on the touch panel 200 is an operation of widening the distance between two contact points or an operation of narrowing the distance between two contact points. Accordingly, with the touch panel 200 of this embodiment, a pinch-out operation and a pinch-in operation can be detected.

Next, a sub-routine of Step S108 for detecting the maximum potential difference is described with reference to FIG. 16.

First, in Step S202, a potential distribution is distributed on the conductive film 21 in the X direction of the conductive film 21 via the resistors R1, R2. As illustrated in FIG. 5, the switch SW1, the switch SW4, the switch SW9, and the switch SW10 are switched on, and the switch SW2, the switch SW3, the switch SW5, the switch SW6, the switch SW7, and the switch SW8 are switched off, so that a potential distribution is generated in X-direction via the resistors R1, R2. The switch SW11 is switched off.

Then, in Step S204, the divided voltage at the second power-feed terminal 32 is measured by the measuring part AD2 in a state where the potential distribution is generated on the conductive film 21 in the X-direction of the conductive film 21. The potential measured in this state are referred to as a "measured potential AD1 (X)".

Then, in Step S206, the divided voltage at the second power-feed terminal 32 is measured by the measuring part AD2 in a state where the potential distribution is generated in the X-direction. The potential measured in this state are referred to as a "measured potential AD2 (X)".

Then, in Step S208, a potential distribution is distributed on the conductive film 21 in Y direction of the conductive film 21 via the resistors R2, R4. As illustrated in FIG. 6, the switch SW3, the switch SW5, the switch SW7, and the switch SW10 are switched on, and the switch SW1, the switch SW2, the switch SW4, the switch SW6, the switch SW8, and the SW9 are switched off, so that a potential distribution is generated on the conductive film 21 in the Y-direction of the conductive film 21 via the resistors R3, R4. The switch SW11 is also switched off.

Then, in Step S210, the divided voltage at the second power-feed terminal 32 is measured by the measuring part AD2 in a state where the potential distribution is generated in Y-direction. The potential measured in this state are referred to as a "measured potential AD2 (Y)".

Then, in Step S212, the divided voltage at the third power-feed terminal 33 is measured by the measuring part AD3 in the state where the potential distribution is generated in Y-direction. The potential measured in this state are referred to as a "measured potential AD3 (Y)".

Then, in Step S214, a potential difference $\Delta V_{1X}$ between the measured potential AD1 (X) and a reference potential (=|measured potential AD1 (X)−reference potential AD1 (X)|) is calculated. The reference potential AD1 (X) is a potential at the first power-feed terminal measured beforehand by the measuring part AD1 in the state where potential distribution is generated on the conductive film 21 in the X direction of the conductive film 21 via a resistor while the touch panel is not touched.

Then, in Step S216, a potential difference $\Delta V_{2X}$ between the measured potential AD2 (X) and a reference potential (=|measured potential AD2 (X)−reference potential AD2 (X)|) is calculated. The reference potential AD2 (X) is a potential at the second power-feed terminal measured beforehand by the measuring part AD2 in the state where potential distribution is generated in the Y-direction via a resistor while the touch panel is not touched.

Then, in Step S218, a potential difference $\Delta V_{2Y}$ between the measured potential AD2 (Y) and a reference potential (=|measured potential AD2 (Y)−reference potential AD2 (Y)|) is calculated. The reference potential of AD2 (Y) is a potential at the second power-feed terminal measured beforehand by the measuring part AD2 in the state where potential distribution is generated on the conductive film 21 in Y direction via a resistor while the touch panel is not touched.

Then, in Step S220, a potential difference $\Delta V_{3Y}$ between the measured potential AD3 (Y) and a reference potential (=|measured potential AD3 (Y)−reference potential AD3 (Y)|) is calculated. The reference potential AD3 (Y) is a potential at the third power-feed terminal measured beforehand by the measuring part AD3 in the state where potential distribution is generated on the conductive film 21 in the Y-direction of the conductive film 21 via a resistor while the touch panel is not touched.

Then, in Step S222, the largest potential difference among the potential differences $\Delta V_{1X}$, $\Delta V_{2X}$, $\Delta V_{2Y}$, and $\Delta V_{3Y}$ is selected to be the maximum potential difference $\Delta Vm$. The direction that the voltage has been applied for obtaining the maximum potential difference $\Delta Vm$ and the potential measuring part that was used to measure the potential corresponding to the maximum potential difference $\Delta Vm$ are stored in the storage 8

Figure 17:
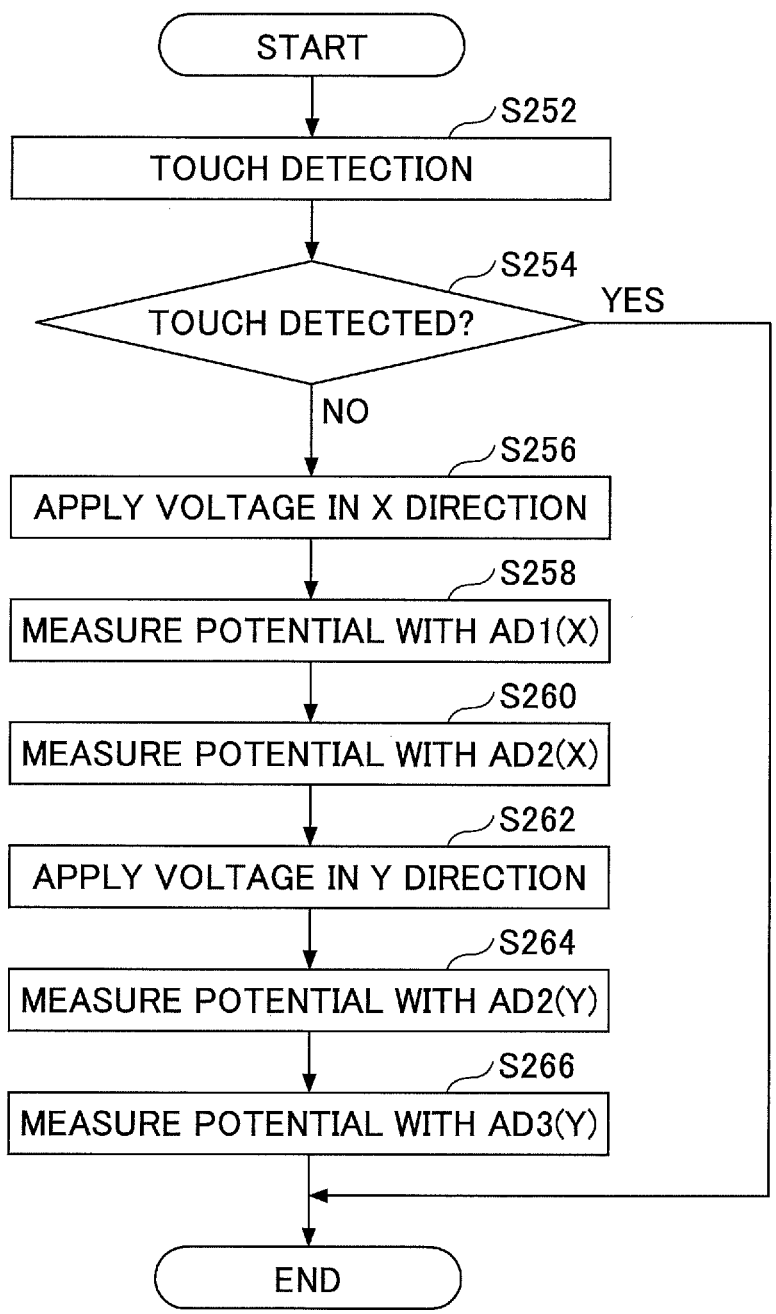
FIG. 17 is a flowchart illustrating the detection method of the first embodiment.

Next, a method for measuring reference potentials is described with reference to FIG. 17. The reference potentials are measured before conducting touch detection process with the touch panel 200 illustrated in FIG. 13, and stored in the storage 88. The reference potentials AD1 (X), AD2 (X), AD2 (Y), and AD3 (Y) are measured and stored in the storage 88.

First, in Step S252, a touch-on detection is performed. The touch-on detection is conducted by measuring the potential with the measuring part AD4 in a state illustrated in FIG. 14. In this state, the potential of the conductive film 21 is Vcc.

Then, in Step S254, it is determined whether a touch-on operation is being performed. In a case where an object is contacting the touch panel 200 (touch-on), the potential in which the power source Vcc is divided by the resistance of the conductive film 11 and the fifth resistor R5 is detected by the measuring part AD4. When the potential is detected by the measuring part AD4, it is determined that a touch-on operation is performed on the touch panel 200, and the flow of FIG. 17 is ended. If no potential is detected by the measuring part AD4, the flow of FIG. 17 proceeds to Step S256.

In Step S256, a potential distribution is generated on the conductive film 21 in the X-direction of the conductive film 21 via the resistors R1, R2 in the state illustrated in FIG. 5. The switch SW11 is switched off. In the state of Step S256, conductive film 11 and the conductive film 21 are not in contact.

Then, in Step S258, the measuring part AD1 measures a potential in a state where the potential distribution is generated on the conductive film 21 in the X-direction of the conductive film 21. The potential measured by the measuring part AD1 in this state is referred to as a reference potential AD1 (X).

Then, in Step S260, the measuring part AD2 measures a potential in the state where the potential distribution is generated on the conductive film 21 in the X-direction of the conductive film 21. The potential measured by the measuring part AD2 in this state is referred to as a reference potential AD2 (X).

Then, in Step S262, a potential distribution is generated in the Y-direction via the resistors R3, R4 in the state illustrated in FIG. 6. The switch SW11 is switched off. In the state of Step S262, the conductive film 11 and the conductive film 21 are not in contact.

Then, in Step S264, the measuring part AD2 measures a potential in the state where the potential distribution is generated on the conductive film 21 in the Y-direction of the conductive film 21. The potential measured by the measuring part AD2 in this state is referred to as a reference potential AD2 (Y).

Then, in Step S266, the measuring part AD3 measures a potential in the state where the potential distribution is generated on the conductive film 21 in the Y-direction of the conductive film 21. The potential measured by the measuring part AD3 in this state is referred to as a reference potential AD3 (Y).

By performing the above-described processes, the reference potential of each power-feed terminal of the touch panel 200 is measured. Each of the measured reference potentials are stored in the storage 88 and used for calculating potential difference Δv.

With the touch panel apparatus according to the embodiment, the distance and coordinates of contact points of a multi-touch operation can be detected, so that a pinch-out operation and a pinch-in operation can be detected.

Second Embodiment

Next, a second embodiment of the present invention is described. A touch panel apparatus of this embodiment enables detection of a gesture operation other than the pinch-out operation and the pinch-in operation_that is performed, for example, when rotating an image displayed on a screen.

When focusing on the amount of change of potential differences ΔV illustrated in FIGS. 8-11, the combination of potential differences Δ causing significant change differs depending on the directions S1-S4 illustrated in FIG. 7. This is because the distance between the positions of two contact points and the power-feed terminal is short. Because the resistance distribution of the ITO film that serves as the conductive film 21 is the same, the distance between two points being short is equivalent to the resistance value being small. In addition, a combined resistance generated between the two points has a resistance that is lower than other parts of the conductive film 21. Therefore, electric current flows through a path having the smallest resistance, that is, a path between an electrode that is close to a depressed position of two points and the ground GND. In other words, the direction of two contact points can be defined according to the combination of an electrode having the largest potential difference and an electrode having the second largest potential difference.

For example, according to the pattern S1 illustrated in FIG. 7, AD2 (X) has the largest potential difference value and AD1 (X) has the second largest potential difference value as illustrated in FIG. 8. Therefore, the combination of the largest potential difference and the second largest potential difference is AD2 (X) and AD1 (X) in the case of pattern S1.

According to the pattern S2 illustrated in FIG. 7, AD1 (X) has the largest potential difference value and AD3 (Y) has the second largest potential difference value as illustrated in FIG. 9. Therefore, the combination of the largest potential difference and the second largest potential difference is AD1 (X) and AD3 (Y) in the case of pattern S2.

According to the pattern S3 illustrated in FIG. 7, AD3 (Y) has the largest potential difference value and AD2 (Y) has the second largest potential difference value as illustrated in FIG. 10. Therefore, the combination of the largest potential difference and the second largest potential difference is AD3 (Y) and AD2 (Y) in the case of pattern S3.

According to the pattern S4 illustrated in FIG. 7, AD2 (X) has the largest potential difference value and AD2 (Y) has the second largest potential difference value as illustrated in FIG. 11. Therefore, the combination of the largest potential difference and the second largest potential difference is AD2 (X) and AD2 (Y) in the case of pattern S4.

Accordingly, there is a correlation between the direction in which two contact points are arranged and the power-feed terminals having the largest potential difference and the second largest potential difference, and the combination of the largest potential difference and the second largest potential difference is different depending on each pattern S1-S4. Therefore, the positional relationship of two contact points, that is, the direction in which two contact points are arranged can be determined based on the combination of the largest potential difference and the second largest potential difference.

When the combination of the largest potential difference and second largest potential difference is AD2 (X) and AD1 (X), it can be determined that a pattern of the two contact points corresponds to the pattern S1 in which two contact points are separated along the X-direction.

When the combination of the largest potential difference and the second largest potential difference is AD1 (X) and AD3 (Y), a pattern of the two contact points corresponds to the pattern S2 in which two contact points are separated along a straight line from an upper left area to a lower right area.

When the combination of the largest potential difference and the second largest potential difference is AD3 (Y) and AD2 (Y), a pattern of the two contact points corresponds to the pattern S3 in which two contact points are separated along the Y-direction.

When the combination of the largest potential difference and the second largest potential difference is AD2 (X) and AD2 (Y), a pattern of the two contact points corresponds to the pattern S4 in which two contact points are separated along a straight line from an upper right area to a lower left area.

In a case where the touch panel 200 is contacted at two contact points, the two contact points may be arranged in a direction deviated from the directions corresponding to patterns S1 to S4. However, even in this case, the direction of the two contact points can be determined based on the relationship between the largest potential difference and the second largest potential difference of each pattern S1 to S4.

The touch panel according to this embodiment uses the combination of the largest and second largest potential differences to detect positions of two contact points.

Figure 18:
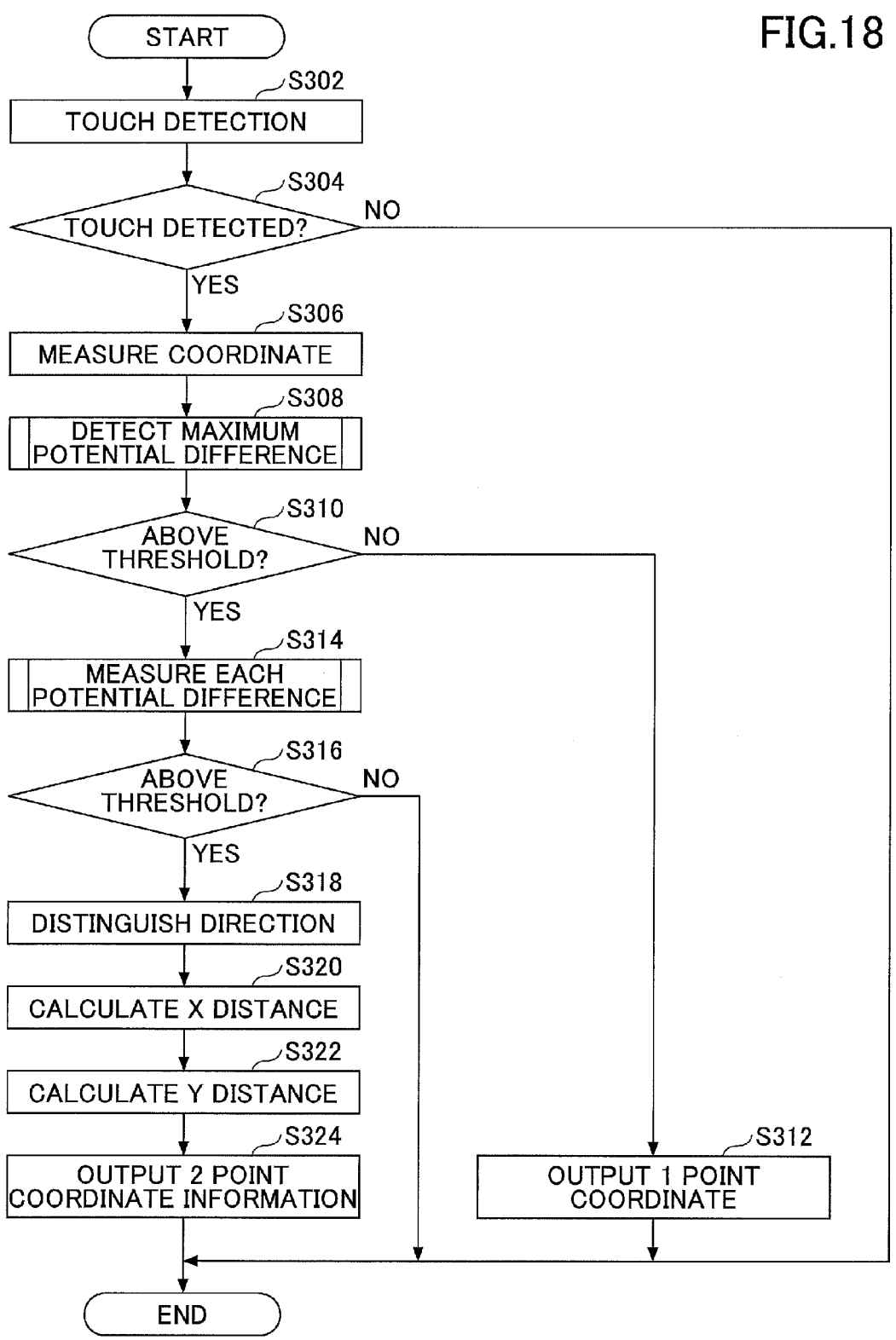
FIG. 18 is a flowchart illustrating a detection method according to a second embodiment of the present invention.

The method for detecting a position in a touch panel of this embodiment is described with reference to FIG. 18.

First, a touch-on detection is performed in Step S302. The measuring part AD4 measures a potential in a state illustrated in FIG. 14. The potential of each of the first power-feed terminal 31, the second power-feed terminal 32, and the third power-feed terminal 33 is Vcc in this state.

Then, in Step S304, it is determined whether a touch-on operation is being performed. When the potential is detected by the measuring part AD4, it is determined that a touch-on operation is performed on the touch panel 200, and the flow of FIG. 18 proceeds to Step S306. If no potential is detected by the measuring part AD4, it is determined that a touch-on operation is not performed, and the flow of FIG. 18 is ended.

Then, in Step S306, a coordinate of the contact point is detected. When detecting the coordinates, a potential distribution is generated on the conductive film 21 in the X-direction of the conductive film 21 to allow the measuring part AD4 measure the potential as illustrated in FIG. 3. Then, the coordinate detector 82 detects the X-coordinate of the contact point based on the potential measured by the measuring part AD4.

Similarly, a potential distribution is generated on the conductive film 21 in the Y-direction of the conductive film 21 to allow the measuring part AD4 measure the potential as illustrated in FIG. 4. Then, the coordinate detector 82 detects the Y-coordinate of the contact point based on the potential measured by the measuring part AD4. Similar to the first embodiment, in a case where the contact point contacting the touch panel 200 is one point, the X and Y coordinates indicate the coordinates of the contact point, and in a case where the touch panel 200 is contacted at two points, the coordinates indicate the coordinates of the middle point of the two contact points.

Figure 16:
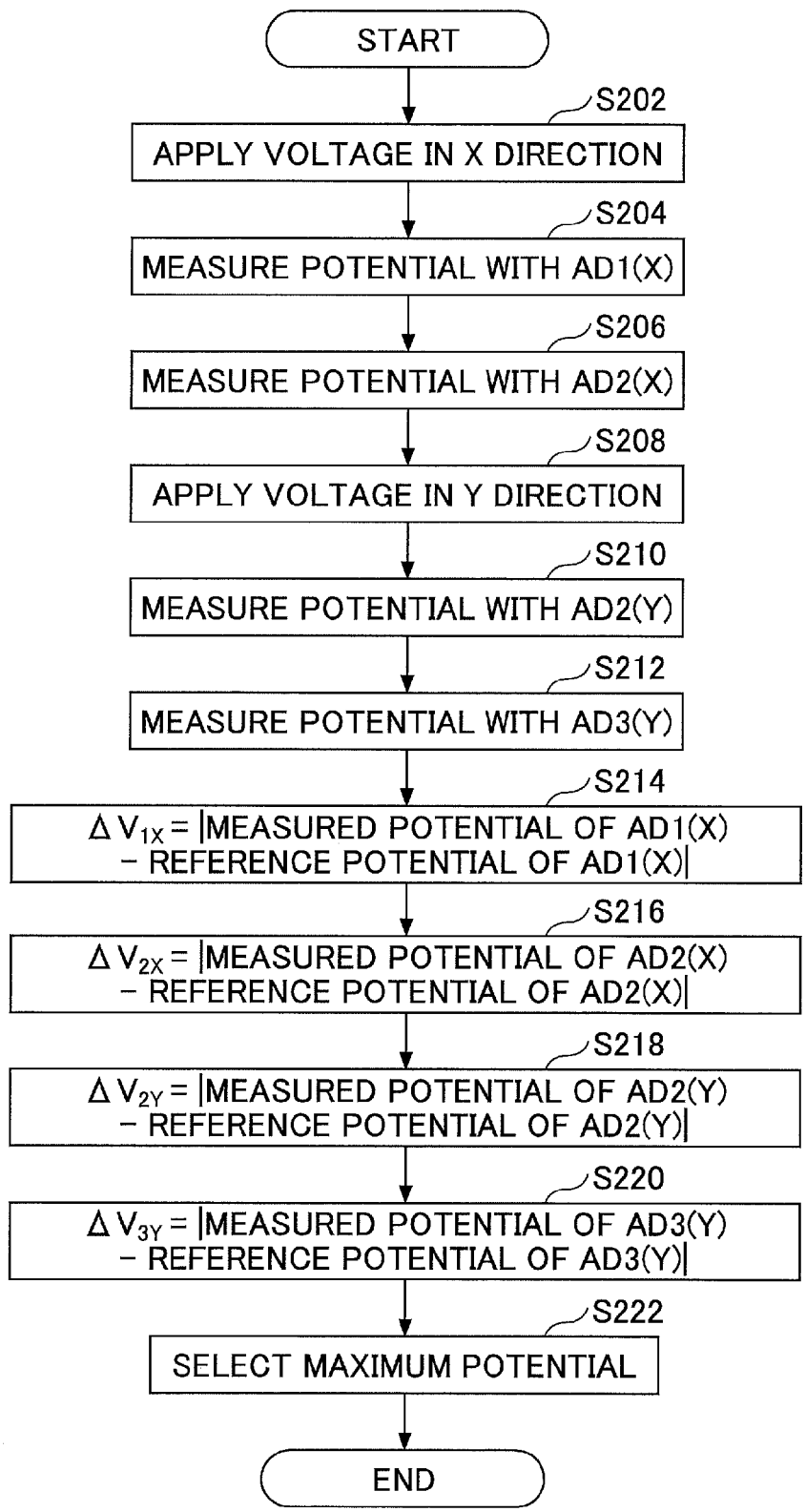
FIG. 16 is a flowchart illustrating the detection method of the first embodiment.

Then, in Step S308, the maximum potential difference $\Delta Vm$ is detected, and a sub-routine for detecting the maximum potential difference illustrated in FIG. 16 is conducted.

Then, similar to the first embodiment, the determination part 83 determines whether the maximum potential difference $\Delta Vm$ obtained in Step S308 is greater than a threshold $\Delta Vth$ in Step S310. When the maximum potential difference $\Delta Vm$ is less than the threshold $\Delta Vth$, the contact point is determined to be one point, and the flow of FIG. 18 proceeds to Step S312. When the maximum potential difference $\Delta Vm$ is greater than the threshold $\Delta Vth$, the contact point is determined to be two points, and the flow of FIG. 18 proceeds to Step S314.

When it is determined that the contact point is one point, the coordinates detected in Step S306 are output as the coordinates of the contact point in Step S312.

Figure 19:
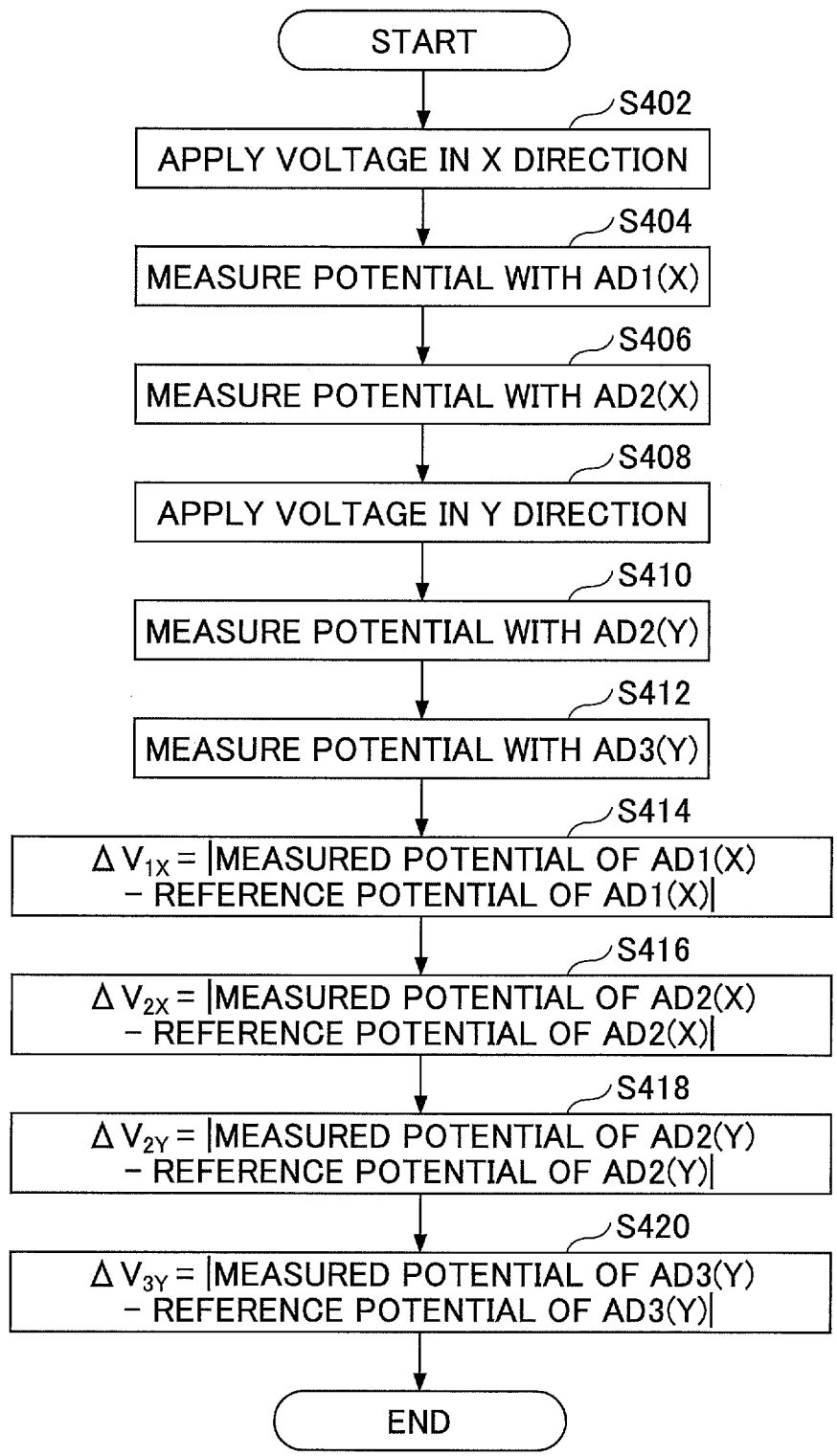
FIG. 19 is a flowchart illustrating the detection method of the second embodiment.

On the other hand, when it is determined that the contact point is two points, each measuring part measures a potential difference $\Delta V$ in Step S314, and the below-described sub-routine for measuring the potential difference of FIG. 19 is performed.

Then, in Step S316, a potential difference having the largest value among the potential differences $\Delta V_{1X}$, $\Delta V_{2X}$, $\Delta V_{2Y}$ and $\Delta V_{3Y}$ is assumed as the maximum potential difference $\Delta Vm$, and it is determined whether the maximum potential difference $\Delta Vm$ is greater than the threshold $\Delta Vth$. If the maximum potential difference $\Delta Vm$ is less than the threshold $\Delta Vth$, the measured potential is determined as an error, and the flow of FIG. 18 is ended. If the maximum potential difference $\Delta Vm$ is greater than the threshold $\Delta Vth$, the contact point is determined to be two points, and the flow of FIG. 18 proceeds to Step S318.

Then, in Step S318, the direction in which the two contact points are arranged is detected. The direction detector 86 selects the potential difference having the largest value and the second largest value among the potential differences $\Delta V_{1X}$, $\Delta V_{2X}$, $\Delta V_{2Y}$ and $\Delta V_{3Y}$, and determines the positional relationship between the two contact points, that is, direction of the two contact points, according to the combination of the selected potential differences. If the combination of the largest and second largest potential differences is $\Delta V_{1X}$ and $\Delta V_{2X}$, that is, AD1 (X) and AD2 (X), the two contact points correspond to the pattern S1.

When the combination of the largest and second largest potential differences is $\Delta V_{1X}$ and $\Delta V_{3Y}$, that is, AD1 (X) and AD3 (Y), the two contact points correspond to the pattern S2.

When the combination of the largest and second largest potential differences is $\Delta V_{2Y}$ and $\Delta V_{3Y}$, that is, AD2 (Y) and AD3 (Y), the two contact points correspond to the pattern S3.

When the combination of the largest and second largest potential differences is $\Delta V_{2X}$ and $\Delta V_{2Y}$, that is, AD2 (X) and AD2 (Y), the two contact points correspond to the pattern S4.

Then, in Step S320, the distance between two points in the X direction, that is, the difference between the X-components of two contact points is calculated. The distance calculator 84 calculates the distance between two points in the X-direction by using, for example, the Expression (1) or Expression (2) based on the potential differences $\Delta V_{1X}$, $\Delta V_{2X}$. In the case of the pattern S1, the greater of the potential differences $\Delta V_{1X}$, $\Delta V_{2X}$ is used to calculate the distance between the two contact points in X-direction. In the case of the pattern S2 or pattern S4, one of the potential differences $\Delta V_{1X}$ and $\Delta V_{2X}$ is used to calculate the distance between two contact points in X-direction.

Then, in Step S322, the distance between two contact points on the touch panel 200 in Y-direction is calculated. The distance calculator 84 calculates the distance between the two points contacting the touch panel 200 in Y-direction by using, for example, the Expression (1) or Expression (2) based on the potential differences $\Delta V_{2Y}$, $\Delta V_{3Y}$. For example, in the case of the pattern S3, the greater of the potential differences $\Delta V_{2Y}$, $\Delta V_{3Y}$ is used to calculate the distance between the two contact points in Y-direction. In the case of the pattern S2 or pattern S4, one of the potential differences $\Delta V_{2Y}$ and $\Delta V_{3Y}$ is used to calculate the distance between two contact points in Y-direction.

Then, in Step S324, coordinate data of the two contact points is output. In this embodiment, the two point calculator 85 calculates the coordinates of the two contact points based on the distance between two contact points in X-direction obtained in Step S320, the distance between two contact points in Y-direction obtained in Step S322, and the coordinates detected in Step S306. The two point calculator 85 outputs the calculated coordinates of the two points as coordinate data.

In a case where an arrangement of the two contact points corresponds to the pattern S1, the X-coordinates of one contact point is calculated by adding the X-coordinates detected in Step S306 with half the value of the distance between two points in the X-direction obtained in Step S320 whereas the X-coordinates of the other contact point is calculated by subtracting half the value of the distance between two points in the X-direction obtained in Step S320 from the X-coordinates detected in Step S306. Thereby, the X coordinates of each of the two contact points are obtained. The Y-coordinates of the two contact points are assumed as the Y-coordinates detected in Step S306. The calculated coordinates of the two contact points are output as coordinate data.

In a case where an arrangement of the two contact points corresponds to the pattern S2, the X-coordinates of one contact point is calculated by adding the X-coordinates detected in Step S306 with half the value of the distance between the X-components of the two points obtained in Step S320 whereas the X-coordinates of the other contact point is calculated by subtracting half the value of the distance between the X-components of the two points obtained in Step S320 from the X-coordinates detected in Step S306. Thereby, the X-coordinates of each of the two contact points are obtained. Further, the Y-coordinates of one contact point is calculated by adding the Y-coordinates detected in Step S306 with half the value of the distance between the Y-components of the two points obtained in Step S322 whereas the Y-coordinates of the other contact point is calculated by subtracting half the value of the distance between the Y-components of the two points obtained in Step S322 from the Y-coordinates detected in Step S306. Thereby, the Y-coordinates of each of the two contact points are obtained. Because the pattern S2 is a pattern in which the two contact points are separated along a diagonal line in the upper left and lower right directions, the coordinates of the two points can be identified based on the calculated coordinates of the two points. The calculated coordinates of the two contact points are output as coordinate data.

In a case where the two points contacting the touch panel 200 corresponds to the pattern S3, the Y-coordinates of one contact point is calculated by adding the Y-coordinates detected in Step S306 with half the value of the distance between the Y-components of the two points obtained in Step S322 whereas the Y-coordinates of the other contact point is calculated by subtracting half the value of the distance between the Y-components of the two points obtained in Step S322 from the Y-coordinates detected in Step S306. Thereby, the Y-coordinates of each of the two contact points are obtained. The X-coordinates of the two contact points are assumed as the X-coordinates detected in Step S306. The calculated coordinates of the two contact points are output as coordinate data.

In a case where the two points contacting the touch panel 200 corresponds to the pattern S4, the X-coordinates of one contact point is calculated by adding the X-coordinates detected in Step S306 with half the value of the distance between the X-components of the two points obtained in Step S320 whereas the X-coordinates of the other contact point is calculated by subtracting half the value of the distance between the X-components of the two points obtained in Step S320 from the X-coordinates detected in Step S306. Thereby, the X-coordinates of each of the two contact points are obtained. Further, the Y-coordinates of one contact point is calculated by adding the Y-coordinates detected in Step S306 with half the value of the distance between the Y-components of the two points obtained in Step S322 whereas the Y-coordinates of the other contact point is calculated by subtracting half the value of the distance between the Y-components of the two points obtained in Step S322 from the Y-coordinates detected in Step S306. Thereby, the Y-coordinates of each of the two contact points are obtained. Because the pattern S4 is a pattern in which the two points contacting the touch panel 200 are separated along a diagonal line in the upper right and lower left directions, the coordinates of the two points can be identified based on the calculated coordinates of the two points. The calculated coordinates of the two contact points are output as coordinate data.

By performing a process of this embodiment, the coordinates of two contact points and the direction in which the two contact points are arranged can be determined. Further, by repeating the above-described steps and determining the direction in which the two contact points are arranged and determining the change of the distance between the two points, it can be determined whether the operation performed on the touch panel 200 is a pinch-in/pinch-out operation or a gesture operation such as for rotating an image on a display.

With the touch panel apparatus according to the second embodiment, the coordinates of each of the two contact points can be detected, not only can a multi-touch operation be detected, but also a gesture operation such as reducing, increasing, or rotating of an image can be detected with the two points contacting the touch panel 200.

Two contact points move in a clockwise direction when the patterns of the positional relationship between the two contact points shifts in an order of pattern S1→S2→S3→S4→S1. In this case, a gesture operation in a clockwise rotation can be detected by determining such change of the pattern of the two contact points. Further, two contact points move in a counter-clockwise direction when the patterns of the positional relationship between the two contact points shifts in an order of pattern S1→S4→S3→S2→S1. In this case, a gesture operation in a counter-clockwise rotation can be detected by determining the changes of each of the patterns (pattern S1→S2→S3→S4→S1 and pattern S1→S4→S3→S2→S1) of the two points.

In a case where the pattern S1 changes to the pattern S2 or the pattern S2 changes to the pattern S1, the potential difference AD1 (X) maintains to have a large value. In a case where the pattern S2 changes to the pattern S3 or the pattern S3 changes to the pattern S2, the potential difference AD3 (Y) maintains to have a large value.

In a case where the pattern S4 changes to the pattern S1 or the pattern S1 changes to the pattern S4, the potential difference AD2 (X) maintains to have a large value.

Next, a sub-routine of S314 for detecting the potential difference is described with reference to FIG. 19.

First, in Step S402, a potential distribution is distributed in the X direction via the resistors R1, R2 as illustrated in FIG. 5. The switch SW11 is switched off.

Then, in Step S404, a potential is measured by the measuring part AD1 in a state where the potential distribution is generated on the conductive film 21 in the X-direction of the conductive film 21. The potential measured in this state are referred to as a "measured potential AD1 (X)".

Then, in Step S406, a potential is measured by the measuring part AD2 in a state where the potential distribution is generated on the conductive film 21 in the X-direction of the conductive film 21. The potential measured in this state are referred to as a "measured potential AD2 (X)".

Then, in Step S408, a potential distribution is generated on the conductive film 21 in the Y-direction of the conductive film 21 via resistors R3, R4 as illustrated in FIG. 6. The switch SW11 is switched off.

Then, in Step S410, a potential is measured by the measuring part AD2 in a state where the potential distribution is generated in the Y-direction. The potential measured in this state are referred to as a "measured potential AD2 (Y)".

Then, in Step S412, a potential is measured by the measuring part AD3 in the state where the potential distribution is generated on the conductive film 21 in the Y-direction of the conductive film 21. The potential measured in this state are referred to as a "measured potential AD3 (Y)".

Then, in Step S414, a potential difference $\Delta V_{1X}$ between the measured potential AD1 (X) and a reference potential (=|measured potential AD1 (X)−reference potential AD1 (X)|) is calculated and stored in the storage. The reference potential AD1 (X) is a potential measured beforehand by the measuring part AD1 in the state where potential distribution is generated on the conductive film 21 in the X direction of the conductive film 21 while the touch panel is not touched.

Then, in Step S416, a potential difference $\Delta V_{2X}$ between the measured potential AD2 (X) and a reference potential (=|measured potential AD2 (X)−reference potential AD2 (X)|) is calculated and stored in the storage. The reference potential AD2 (X) is a potential measured beforehand by the measuring part AD2 in the state where potential distribution is generated on the conductive film 21 in the Y-direction of the conductive film 21.

Then, in Step S418, a potential difference $\Delta V_{2Y}$ between the measured potential AD2 (Y) and a reference potential (=|measured potential AD2 (Y)−reference potential AD2 (Y)|) is calculated. The reference potential AD2 (Y) is a potential measured beforehand by the measuring part AD2 in the state where the potential distribution is generated on the conductive film 21 in the Y direction of the conductive film 21.

Then, in Step S420, a potential difference $\Delta V_{3Y}$ between the measured potential AD3 (Y) and a reference potential (=|measured potential AD3 (Y)−reference potential AD3 (Y)|) is calculated and stored in the storage. The reference potential AD3 (Y) is a potential measured beforehand by the measuring part AD3 in the state where the potential distribution is generated on the conductive film 21 in the Y-direction of the conductive film 21.

With this embodiment, a gesture operation such as rotation can be detected by determining the changes of the positional relationship between two contact points. Further, with this embodiment, detection of a multi-touch operation and detection of various gesture operations such as rotation with two contact points contacting can be achieved because the coordinates of each of the contact two points can be detected.

Other aspects of the second embodiment are substantially the same as the aspects described in the first embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A touch panel apparatus comprising:
  a first substrate in which a first conductive film is formed thereon;
  a second substrate in which a second conductive film is formed thereon;
  a first terminal, a second terminal, a third terminal, and a fourth terminal respectively provided on the second substrate; and
  a controller,
  wherein the controller is configured to:
  calculate a first potential difference between a potential of the first terminal and a first reference potential and a second potential difference between a potential of the second terminal and a second reference potential, in a state where the first terminal and the second terminal are connected to the power source potential and the third and fourth terminals are connected to the ground potential,
  calculate a third potential difference between a potential of the second terminal and a third reference potential and a fourth potential difference between a potential of the third terminal and a fourth reference potential, in a state where the second terminal and the third terminal are connected to the power source potential and the first and fourth terminals are connected to the ground potential,
  obtain a potential difference having a largest value among the first, second, third, and fourth potential differences, and
  calculate a positional relationship between two contact points based on the potential difference having the largest value.

2. The touch panel apparatus as claimed in claim 1, further comprising:
  a first resistor connected to the first terminal;
  a second resistor connected to the second terminal;
  a third resistor connected to the second terminal; and
  a fourth resistor connected to the third terminal,
  wherein the power source potential is applied to each terminal via the corresponding resistor, and
  the first resistor and the second resistor have the same resistance value, and the third resistor and the fourth resistor have the same resistance value.

3. The touch panel apparatus as claimed in claim 1, wherein the controller is further configured to:
  obtain a potential difference having the second largest value among the first, second, third, and fourth potential differences, and
  calculate the positional relationship between two contact points based on the potential difference having the largest value and the potential difference having the second largest value.

4. The touch panel apparatus as claimed in claim 1, wherein the controller is further configured to calculate a distance between the two contact points based on the potential difference having the largest value.

5. The touch panel apparatus as claimed in claim 3, wherein the controller is further configured to calculate a distance between the two contact points based on the potential difference having the largest value and the potential difference having the second largest value.

6. The touch panel apparatus as claimed in claim 5, wherein the controller is further configured to:
   detect a coordinate in a first direction by measuring a potential of the first conductive film in a state where the first and second terminals are connected to the power source and the third and fourth terminals are connected to the ground potential,
   detect a coordinate in a second direction by measuring a potential of the first conductive film in a state where the second and third terminals are connected to the power source and the first and fourth terminals are connected to the ground potential, and
   detect the coordinates of the two contact points based on the coordinate in the first direction, the coordinate in the second direction, and the distance between the two contact points.

7. A touch panel apparatus comprising:
   a first substrate including a first conductive film;
   a second substrate including a second conductive film;
   a first terminal, a second terminal, a third terminal, and a fourth terminal respectively provided on the second substrate;
   a controller,
   a first resistor connected to the first terminal;
   a second resistor connected to the second terminal;
   a third resistor connected to the second terminal; and
   a fourth resistor connected to the third terminal;
   wherein the controller is configured to:
   measure a potential of the first terminal and a potential of the second terminal in a state where the first terminal is connected to a power source potential via the first resistor, the second terminal is connected to the power source potential via the second resistor, and the third and fourth terminals are connected to a ground potential,
   measure a potential of the second terminal and a potential of the third terminal in a state where the second terminal is connected to the power source potential via the third resistor, the third terminal is connected to the power source potential via the fourth resistor, and the first and fourth terminals are connected to the ground potential,
   calculate potential differences between the measured potentials of the first, second, and third terminals and reference potentials corresponding to the first, second, and third terminals, respectively, and
   detect two contact points based on the calculated potential differences.

8. The touch panel apparatus as claimed in claim 7, wherein the controller is further configured to:
   obtain a potential difference having a largest value among the calculated potentials differences, and
   calculate a positional relationship of the two contact points based on the potential difference having a largest value.

9. The touch panel apparatus as claimed in claim 8, wherein the controller is further configured to:
   obtain a potential difference having the second largest value among the calculated potentials differences, and
   calculate the positional relationship of the two contact points based on the potential difference having the largest value and the potential difference having the second largest value.

10. A method for detecting a position of a contact point on a touch panel having a first substrate including a first conductive film, a second substrate including a second conductive film, and a first terminal, a second terminal, a third terminal, and a fourth terminal respectively provided on four corners of the second substrate, the method comprising:
    calculating a first potential difference between a potential of the first terminal and a first reference potential, and a second potential difference between a potential of the second terminal and a second reference potential, in a state where the first terminal and the second terminal are connected to a power source via a resistor, and the third and fourth terminals are connected to a ground potential;
    calculating a third potential difference between a potential of the second terminal and a third reference potential, and a fourth potential difference between a potential of the third terminal and a fourth reference potential, in a state where the second terminal and the third terminal are connected to the power source via a resistor, and the first and fourth terminals are connected to the ground potential;
    obtaining a potential difference having a largest value among the first, second, third, and fourth potential differences; and
    calculating a positional relationship between two contact points based on the potential difference having the largest value.

11. The method as claimed in claim 10, further comprising:
    obtaining a potential difference having the second largest value among the first, second, third, and fourth potential differences, and
    wherein the positional relationship between the two contact points are calculated based on the potential difference having the largest value and the potential difference having the second largest value.

* * * * *